(12) United States Patent
Martin

(10) Patent No.: US 7,563,201 B2
(45) Date of Patent: *Jul. 21, 2009

(54) TRANSMISSION SYSTEM

(75) Inventor: William Wesley Martin, Milton Keynes (GB)

(73) Assignee: Zeroshift Limited, Milton Keynes (GB)

( * ) Notice: Subject to any disclaimer, the term of this patent is extended or adjusted under 35 U.S.C. 154(b) by 274 days.

This patent is subject to a terminal disclaimer.

(21) Appl. No.: 10/563,520

(22) PCT Filed: Jul. 8, 2004

(86) PCT No.: PCT/GB2004/002946

§ 371 (c)(1), (2), (4) Date: May 5, 2006

(87) PCT Pub. No.: WO2005/005868

PCT Pub. Date: Jan. 20, 2005

(65) Prior Publication Data

US 2007/0042864 A1 Feb. 22, 2007

(30) Foreign Application Priority Data

Jul. 8, 2003 (GB) ................................. 0316004.1
Jul. 14, 2003 (GB) ................................. 0316403.5

(51) Int. Cl.
*B60W 10/02* (2006.01)

(52) U.S. Cl. .................... 477/176; 477/39; 477/169; 477/180

(58) Field of Classification Search .............. 477/39, 477/107, 109, 110, 115, 116, 166, 167, 169, 477/174, 175, 176, 180, 181

See application file for complete search history.

(56) References Cited

U.S. PATENT DOCUMENTS

| 2,314,042 | A | | 3/1943 | Haigh |
| 3,327,822 | A | | 6/1967 | Spencer |
| 3,780,840 | A | | 12/1973 | Thomas |
| 3,872,737 | A | | 3/1975 | Thomas |
| 3,903,738 | A | | 9/1975 | Malchow |
| 4,098,380 | A | | 7/1978 | Thomas |
| 4,274,523 | A | | 6/1981 | Sigg |
| 4,328,719 | A | | 5/1982 | Manna |
| 5,679,099 | A | * | 10/1997 | Kato et al. ............. 477/176 |
| 5,767,420 | A | * | 6/1998 | de Schepper et al. ... 73/862.329 |
| 6,061,619 | A | * | 5/2000 | Schmitz et al. ........... 701/51 |

(Continued)

FOREIGN PATENT DOCUMENTS

DE 607182 12/1934

(Continued)

*Primary Examiner*—David D. Le
(74) *Attorney, Agent, or Firm*—Knobbe, Martens, Olson & Bear, LLP

(57) ABSTRACT

A transmission having a plurality of gear ratios, a selector assembly for selectively engaging the gear ratios, a clutch device for selectively transmitting drive from a drive source to the transmission, and a control system for controlling a clutch torque limit, in which the control system automatically adjusts the clutch torque limit value before the selector assembly selects an unengaged gear ratio, to allow relative rotational movement between input and output sides of the clutch if the torque exceeds the predetermined value when the unengaged gear ratio is engaged by the selector assembly.

36 Claims, 15 Drawing Sheets

U.S. PATENT DOCUMENTS

| | | |
|---|---|---|
| 6,251,043 B1 | 6/2001 | Gierling |
| 6,514,172 B2 * | 2/2003 | Kayano et al. .............. 477/110 |
| 6,899,655 B2 * | 5/2005 | Eggert et al. ................ 477/174 |
| 7,261,379 B2 | 8/2007 | Volker et al. |
| 2002/0134637 A1 | 9/2002 | Salecker et al. |
| 2003/0010144 A1 | 1/2003 | Petzold |
| 2003/0084739 A1 | 5/2003 | Koerber et al. |

FOREIGN PATENT DOCUMENTS

| | | |
|---|---|---|
| DE | 1450177 | 4/1970 |
| DE | 2324881 | 5/1973 |
| DE | 19835334 | 8/1998 |
| DE | 10037401 | 2/2002 |
| EP | 029711 | 6/1981 |
| EP | 0 584 457 | 9/1995 |
| EP | 0809049 | 11/1997 |
| EP | 1460305 | 9/2004 |
| FR | 2312693 | 12/1976 |
| FR | 2583489 | 12/1986 |
| FR | 2810713 | 12/2001 |
| GB | 2100812 | 1/1983 |
| GB | 2159897 | 12/1985 |
| GB | 2 319 817 A | 6/1998 |
| GB | 2 320 531 A | 6/1998 |
| WO | WO 01/29440 A1 | 4/2001 |
| WO | WO 03/078198 | 9/2003 |
| WO | WO 2004/099654 | 11/2004 |
| WO | WO 2005/005868 | 1/2005 |
| WO | WO 2005/005869 | 1/2005 |
| WO | WO 2005/024261 | 3/2005 |
| WO | WO 2005/026570 | 3/2005 |

* cited by examiner

TRANSMISSION SYSTEM

CROSS-REFERENCE TO RELATED APPLICATIONS

This application is the U.S. National Phase filing under 35 U.S.C. §371 of PCT/GB2004/002946, filed Jul. 8, 2004, which designates the United States and was published in English, which claims priority to GB application Ser. Nos. 0316004.1, filed Jul. 8, 2003, and 0316403.5, filed Jul. 14, 2003.

TECHNICAL FIELD

The present invention relates to transmissions having control systems for controlling the selection of gear ratios. The present invention can be used in conjunction with transmission systems of the type described in PCT/GB2004/001976, and with the apparatus and method for measuring torque in a transmission in PCT/GB2004/ filed simultaneously herewith. The features of each of those documents are hereby incorporated by reference, though the invention is not to be considered as being limited to transmissions of the type described.

BACKGROUND ART

In conventional single clutch synchromesh transmission systems for vehicles it is necessary to disengage the transmission from the power source, such as an engine or motor, by operating the clutch before the current gear is deselected and the new gear is engaged. If the power is not disengaged when attempting to engage a new gear the synchromesh is unable to engage the new gear wheel or has to be forced into engagement with the risk of damaging the transmission and creating torque spikes in the transmission. This is because in most cases the speed of the engine is not matched to the speed of the new gear. For motor vehicles such as cars having conventional gearboxes and powered by an engine, the selection of a new gear ratio typically takes between 0.5 and 1 second to complete. So, for example, when a higher gear is selected the time delay allows the engine to reduce its speed [due to its own inertia] to more closely match the speed of the new gear before the clutch re-connects the engine and the transmission, thereby reducing the possibility of torque spikes occurring when the power is reapplied.

In transmission systems where the selection of a new gear ratio takes place almost instantaneously without substantial power interruption, such as the transmission described in PCT/GB2004/001976, large torque spikes can be generated when the new gear is engaged under certain shift conditions. These torque spikes cause shock waves to propagate through the transmission that can be heard and felt by the occupants of the vehicle. The shockwaves can produce a jerky ride for the car occupants and can lead to wear of transmission components and the possibility of components failing. Nevertheless it is desirable to use such a transmission in vehicles since it is more efficient thereby requiring less fuel to operate, produces lower emissions and increases the performance of the car since the application of power is substantially uninterrupted.

For a control system to operate successfully it is important for it to incorporate a means of sensing operational conditions within the transmission. For example, it is often useful to measure or calculate the magnitude and the direction of torque within the transmission to operate control devices that can regulate the torque in the transmission. One approach for measuring torque is to mount a torque sensor on a transmission output shaft for measuring the amount of twist occurring between two known points on the shaft. Torque sensors are very expensive and therefore rarely used in practice. Another drawback is that since the sensor is mounted on the shaft signals must be sent from the sensor to a processing unit via a wireless transmission system or otherwise contact brushes must be mounted about the shaft. There are difficulties in setting up torque sensors using contact brushes and the brushes wear with use and therefore may lead to inaccurate readings or failure of the sensor.

DISCLOSURE OF THE INVENTION

Accordingly the present invention seeks to provide transmissions having a control system for controlling the selection of gear ratios that mitigates the problem of torque spikes.

According to one aspect of the present invention there is provided a transmission having a plurality of gear ratios, selector means for selectively engaging the gear ratios, clutch means for selectively transmitting drive from a drive source to the transmission, and a control system for controlling a clutch torque limit, said control system being constructed and arranged to automatically adjust the clutch torque limit value before the selector means selects an unengaged gear ratio, to allow relative rotational movement between input and output sides of the clutch if the torque exceeds the predetermined value when the unengaged gear ratio is engaged by the selector means.

The clutch torque limit is the amount of torque that clutch is arranged to transmit to the transmission in a given operational condition. The value of the clutch torque limit can be adjusted by controlling the operational settings of the input and output sides of the clutch.

Advantageously the control system includes a sensor arranged to detect the operational status of the clutch means and an actuator for controlling the clutch torque limit, such that, in use, the actuator reduces clutch torque limit until the sensor detects a predetermined operational status before selecting an unengaged gear ratio. For example, the actuator can be arranged to control the force between clutch engagement members to control the amount of torque transmitted to the transmission.

Advantageously the clutch means is arranged to increase the clutch torque limit when the new gear ratio has been selected.

Preferably the control system is arranged to reduce the clutch torque limit until the input and output sides of the clutch slip before the selector means selects an unengaged gear ratio.

Preferably sensor means is arranged to detect slip between the input and output sides of the clutch, and wherein the actuator for controlling the clutch torque limit reduces the clutch torque limit until the sensor means detects slip between the input and output sides of the clutch before selecting an unengaged gear ratio. Preferably the clutch means is arranged to increase the clutch torque limit when the new gear ratio has been selected.

Advantageously the control system includes means for controlling the speed and torque of the drive source. Preferably the means for controlling the speed and torque of the drive source is an engine control unit arranged to adjust engine output when the selector assembly engages the new gear ratio.

Advantageously the means for controlling the speed and torque of the drive source is arranged to increase or decrease the speed and torque of the drive source to control output torque of the transmission when a new gear ratio is selected.

Preferably the control system includes means for sensing the position of the selector means within the transmission.

Preferably the control system includes means for sensing the relative rotational positions of a gear wheel and the selector means and means for controlling engagement of the gear wheel by the selector means according to the sensed rotational positions.

Preferably the clutch means is one of a clutch, a torque converter, or a torque converter in combination with a clutch.

Preferably the control system includes means for measuring or estimating and recording the torque in the transmission before an unengaged gear ratio is selected and means for estimating the torque in the transmission after the new gear ratio has been selected.

Preferably the control system includes means to predict a target torque at the completion of the shift control sequence and approach that torque level at a predetermined gradient until the target torque is met and the clutch and throttle conditions are reset to the conditions prior to the instigation of the shift.

Preferably the clutch is arranged to be restored to the condition prior to instigation of the shift before the final target torque is met and the throttle control alone is used to reach the target torque from that time on.

Advantageously the control system includes means for measuring deformation caused by torque in the transmission in at least one static component or assembly that is deformed due to torque in the transmission, and means for controlling the torque in the transmission, wherein the control system is arranged to measure deformation and to adjust the torque in the transmission according to the measured deformation and a known relationship between the gear ratios.

Preferably the known relationship is substantially linear and values corresponding to the measured deformation are adjusted by a scaling factor.

Preferably the means for measuring deformation measures the amount of torsional deformation in the component or assembly.

Advantageously the means for measuring deformation determines the direction of torque in the transmission.

Preferably the component or assembly comprises at least one of a transmission bearing, casing, support member, mounting, or mounting bolts. Preferably the casing comprises one of the gearbox casing and the tail shaft casing.

Preferably the means for measuring deformation includes at least one load cell, and preferably a plurality of load cells. In one embodiment the means for measuring deformation is mounted on a casing having a longitudinal axis and the casing is arranged such that torque in the transmission twistingly deforms the casing about the longitudinal axis. Preferably first and second load cells are mounted on the casing such that the deformation of the casing causes the first and second load cells to generate different outputs. Preferably the load cells are arranged in a Wheatstone bridge circuit.

In one embodiment the means for measuring deformation measures the amount of strain in the component or assembly. The means for measuring deformation includes at least one strain gauge. Preferably the strain gauge is arranged in a Wheatstone bridge circuit.

Preferably the transmission system includes first and second rotatable shafts, and means for transferring drive from one of the shafts to the other shaft including first and second gear wheels each rotatably mounted on the first shaft and having drive formations formed thereon. selector assembly for selectively transmitting torque between the first shaft and the first gear wheel and between the first shaft and the second gear wheel, wherein the selector assembly includes an actuator assembly and first and second sets of engagement members that are moveable into and out of engagement with the first and second gear wheels independently of each other, said selector assembly being arranged such that when a driving force is transmitted, one of the first and second sets of engagement members drivingly engages the engaged gear wheel, and the other set of engagement members is then in an unloaded condition, wherein the actuator assembly is arranged to move the unloaded set of engagement members into driving engagement with the unengaged gear wheel to effect a gear change.

The selector assembly can be arranged such that when a braking force is transmitted the first set of engagement members drivingly engages the engaged gear wheel, and the second set of engagement members is in an unloaded condition, and when a driving force is transmitted the second set of engagement members drivingly engages the engaged gear wheel, and the second set of engagement members is then in an unloaded condition.

The actuator assembly can be arranged to bias the loaded set of engagement members towards the unengaged gear wheel without disengaging the loaded set of engagement members from the engaged gear wheel.

The first and second sets of engagement members can be arranged to rotate, in use, with the first shaft. Preferably the first shaft is an input shaft and the second shaft is an output shaft and drive is transferred from the input shaft to the output shaft.

BRIEF DESCRIPTION OF THE DRAWINGS

An embodiment of the present invention will now be described, by way of example only, with reference to the accompanying drawings in which like references indicate equivalent features, wherein:

FIG. 1b is a perspective view of the outer casings of the transmission of FIG. 1a;

BEST MODE FOR CARRYING OUT THE INVENTION

Figure 1A:
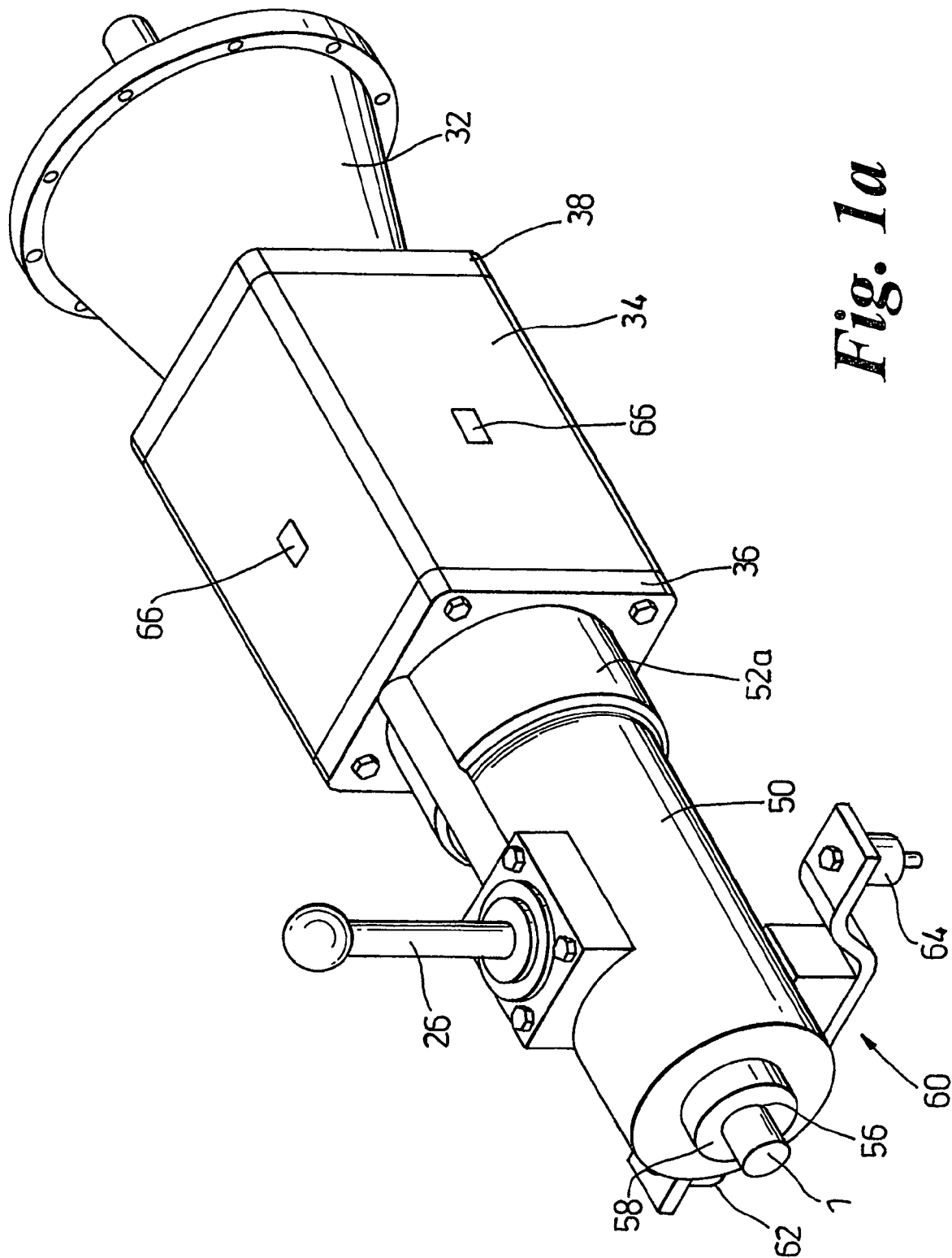
FIG. 1a is a sectional general arrangement of a transmission system in accordance with the present invention.
Figure 1B:
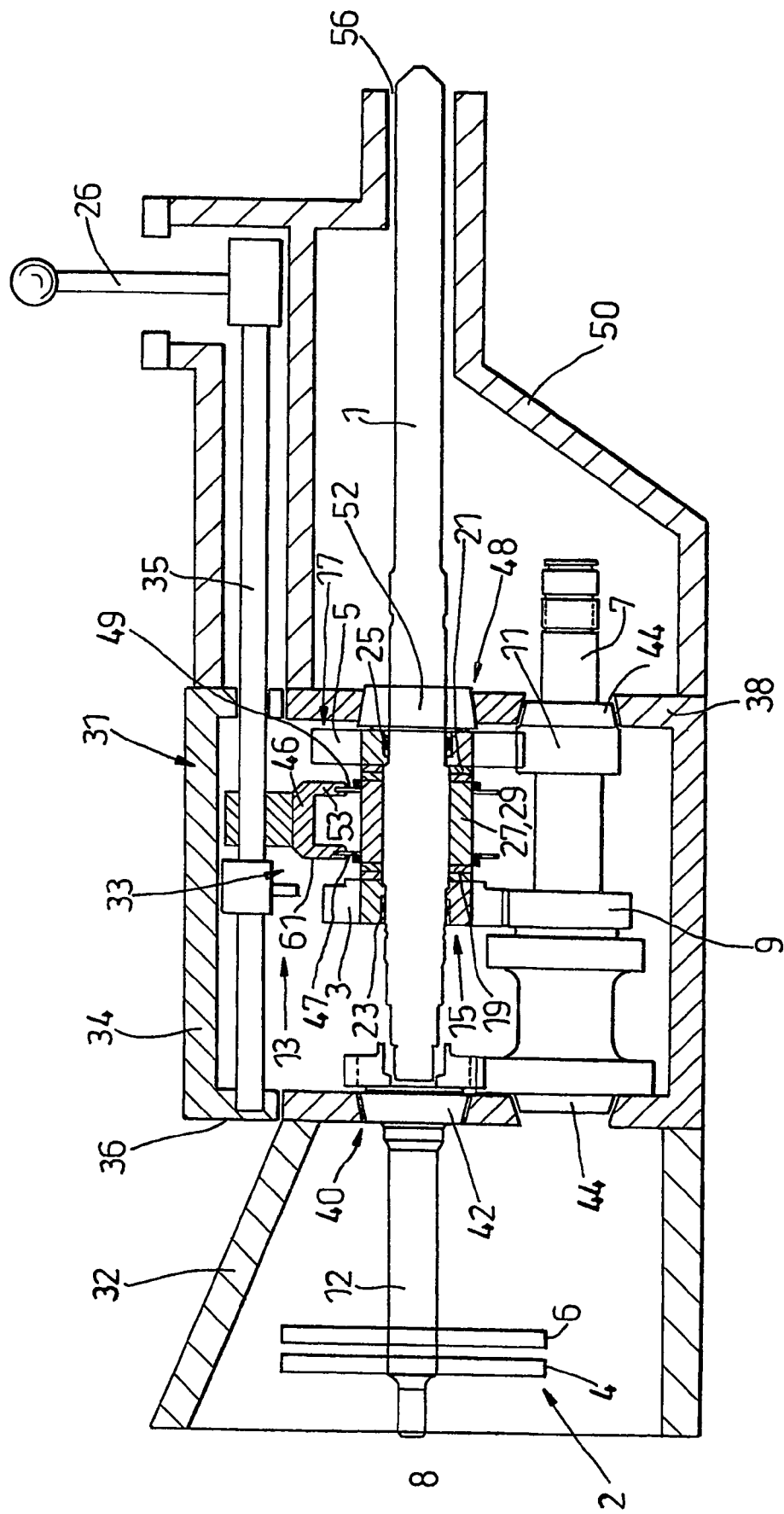
Figure 1C:
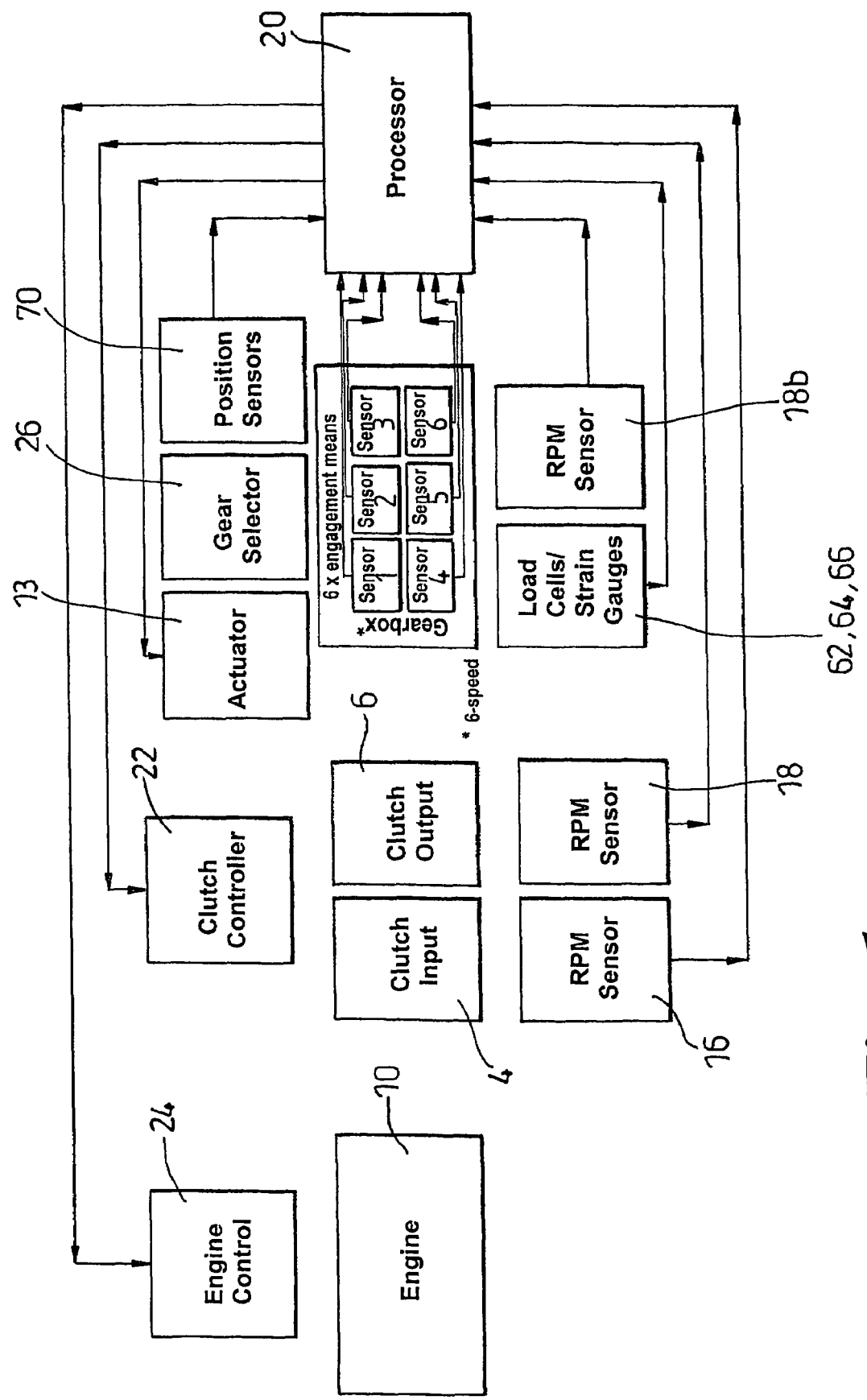
FIG. 1c is a schematic of a control system in accordance with the current invention.

FIGS. 1a and 1b show a transmission system arranged for use in a vehicle such as a motor car and FIG. 1c is a schematic of a control system for controlling the selection of gear ratios.

The transmission system comprises an output shaft 1 having first and second gear wheels 3,5 mounted thereon, an input shaft 7 having third and fourth gear wheels 9,11 mounted thereon and a selector assembly 13. The first and second gear wheels 3,5 are rotatably mounted on the output shaft 1 and the third and fourth gear wheels 9,11 are formed integrally with the input shaft 7 and are locked for rotation therewith. The first and second gear wheels 3,5 mesh with third and fourth gear wheels 9,11 respectively, which are formed integrally with the input shaft, to form first and second gear wheel pairs 15,17. The input shaft 7 is connected to a clutch 2 having first and second clutch plates 4,6. The first clutch plate 4 is connected by a first shaft 8 to the output of an engine 10 and the second clutch plate 6 is connected by a second shaft 12 to the input shaft 7 via a fifth gear wheel 14. The fifth gear wheel 14 is locked for rotation with the second shaft 12. The arrangement is such that the clutch 2 can selectively apply drive from the engine 10 to the transmission output shaft 1, via the input shaft 7 and gear ratios 15,17.

First and second sensors 16,18 are located in the clutch 2 to measure the rotational speeds of the first and second clutch plates 4,6 respectively. The first and second sensors 16,18 are Hall Effect type sensors but other types of sensor such as optical sensors or gear wheel speed measurement devices can be used. The first and second sensors 16,18 are connected to a computer processor 20 that controls the operation of the control system. Optionally, a third sensor 18*b* can be used to measure the rotational speed of the engine output shaft. The clutch 2 includes an actuator 22 for controlling the pressure, and hence the amount of friction, between the first and second clutch plates 4,6 and hence the torque that can be transmitted from the engine 10 to the transmission.

The actuator 22 is controlled electronically by signals received from the computer processor 20 to increase or decrease the pressure between the first and second clutch plates 4,6 and thereby control whether the first and second clutch plates rotate at the same speed (fully engaged) or whether they move relative to each other (slip occurring). The computer processor 20 can detect slip in the clutch 2 from the measured speed of the engine output shaft by detecting changes in the speed and known properties of the transmission, such as which gear ratio is engaged and the number of teeth each gear wheel has. Similarly the computer processor 20 can detect clutch slip by comparing the speed sensors on either side of the clutch. The processor 20 can determine which gear is engaged by reading the speed sensors on the output side of the clutch (gearbox input speed) and gearbox output speed.

The computer processor 20 is also connected to a throttle control mechanism 24 for controlling the speed and torque output of the engine 10. The throttle control mechanism 24 is a throttle pots mechanism that is arranged to selectively override the driver's control of the engine to enable the control system to more closely control the torque output of the engine to assist with maintaining a target gearbox output torque gradient during rapid gear engagement. Signals sent from the computer processor 20 to the throttle pots 24 can increase or decrease the engine speed or torque in accordance with the control signals received, thereby controlling the rotational speed of the first shaft 8 and the first clutch plate 4. The speed of the engine 10 is measured using a conventional sensor the output of which is connected to the computer processor 20.

The effect of torque spikes caused when the selector assembly 13 engages a new gear ratio can be reduced to an acceptable level, that is to a level that cannot be detected by the occupants of the vehicle, by reducing the pressure between the first and second clutch plates 4,6 before the new gear ratio is selected without fully disengaging the plates to allow the clutch plates to slip (relative rotational movement between the clutch plates) when the selector assembly 13 engages the new gear wheel and generates a torque spike in the transmission. Preferably the pressure between the clutch plates 4,6 is reduced to approximately the onset of slip immediately after a gear change has been initiated, for example manually by the driver moving a gear stick 26 or automatically by the control system after measuring a certain engine speed, but before the new gear is engaged. The torque spike generated by the selector assembly 13 engaging the new gear wheel is dissipated because it causes rapid slip between the clutch plates 4,6 since the clutch plates are already at the onset of slip before receiving the additional load caused by the torque spike. This also allows the engine 10 time to adjust its speed to match the speed of the new gear ratio.

The clutch 2 is housed in a first casing 32, commonly known as a bell housing, and the transmission is housed in a second casing 34, known as the gearbox casing. The bell housing 32 comprises is a substantially frustum tubular member and the gearbox casing 34 comprises a tubular member having a rectangular cross-section. First and second end plates 36,38 are each attached to the gearbox casing 34 by bolts. The end plates 36,38 can be detached from the gearbox casing 34 to allow maintenance work to be undertaken. The bell housing 32 is fixed to first end plate 36 by bolts (not shown). The first end plate 36 has a through hole 40 and the second shaft 12 extends from the second clutch plate 6 through the hole 40 and into the gearbox casing 34. The first shaft 8 is supported by a bearing 42 within the gearbox casing for rotational movement relative to the gearbox casing. The bearing 42 is press fit into the first end plate 36.

The input shaft 7 is supported by two bearings 44 for rotational movement relative to the gearbox casing 34. The bearings 44 are press fit into the first and second end plates 36,38.

The second end plate 38 has a through hole 48 and the output shaft 1 extends through the hole 48, into a third casing 50, also known as a tail shaft casing. The output shaft 1 is supported by a bearing 52 that is press fit in the second end plate 38 for rotational movement relative to the gearbox casing 34. The tail shaft casing 50 is fixed to the second end plate 38 by a sleeve 52 that is welded to the second end plate. The tail shaft casing 52 comprises a substantially cylindrical tube with a closed end 54 that is arranged co-axially with the output shaft 1. There is a hole 56 in the end of the tail shaft casing 50 and the output shaft 1 extends through the tail shaft casing 50 and through the hole 56 for connection with a differential (not shown). The output shaft 1 is supported for rotational movement relative to the tail shaft casing 50 by a bearing 58.

A substantially rigid support arrangement 60 for supporting first and second load cells 62,64 is mounted on the underside of the tail shaft casing. The support arrangement 60 is mounted perpendicularly to the longitudinal axis of the tail shaft casing and hence the output shaft 1. The load cells 62,64 rest on a chassis bar (not shown), which is a structural member of the chassis extending laterally across the chassis, but are not attached to the chassis bar.

When the output shaft 1 is driven by the engine 10 via the transmission system, torque is transmitted from the input and output shafts 7,1, along a load path including the bearings 42,44,52,58, the gearbox casing 34, first and second end plates 36,38 and the tail shaft casing 50. The torque in the input and output shafts 7,1 causes the bearings 42,44,52,58, the gearbox casing 34, the first and second end plates 36,38 and the tail shaft casing 50 to deform. The extent of the deformation is proportional to the magnitude of the torque in the output shaft 1 and therefore the extent of deformation measured can be used to control the amount of torque applied to the transmission when selecting between gear ratios. The direction of torque is important since it indicates whether the engine, vehicle or transmission is under going acceleration or deceleration (braking).

In the present embodiment the magnitude and the direction of the torque in the transmission is measured using the load cell arrangement shown in FIG. 1b. When torque is transmitted to the tail shaft casing 50, the casing deforms by twisting. The support arrangement 60 twists with the tail shaft casing 50 thereby causing one of the first and second load cells 62,64, to increase the force applied to the chassis bar and the other load cell to reduce the load applied to the chassis bar. Readings can be taken from the load cells 62,64. The magnitude of the difference between the readings from the first and second load cells 62,64 is proportional to the amount of deformation of the tail shaft casing 50 and hence the magnitude of the torque in the transmission. Direction of the torque is established by determining which of the first and second load cells 62,64 has the larger reading.

The tail shaft casing 50 deforms by a different amount for a given magnitude of torque in the output shaft 1 when different gear ratios are engaged by the selector mechanism 13. This is because of the different relative positions of the gear wheels along the shafts 1,7, the physical properties of the gear wheels such as size, geometry, materials used, tooth form etc. Therefore it is necessary to adjust the values of deformation measured when comparing measured values generated when different gear ratios are engaged by the selector mechanism. Otherwise equivalent measured values would relate to different values of torque in the output shaft 1.

The relationship between the amount of deformation caused in the tail shaft casing 50 when the selector assembly 13 engages different gear ratios, for example the first and second gear ratios 15,17, is known and therefore the amount of torque in the transmission can be controlled by measuring deformation in the tail shaft casing 50, or some other component or assembly that supports or houses rotatable transmission components. Typically the relationship is substantially linear and therefore the amount of deformation measured when the first gear ratio 15 is engaged can be multiplied by a scaling factor for comparison with deformation measured when the second gear ratio 17 is engaged. In some embodiments the relationship may be non-linear.

It is necessary for the control system to know the correct relationship to apply when selecting between gear ratios. When more than one selection can be made, and hence a plurality of relationships exist between different ratios, it is necessary for the control system to know the position of the selector assembly 13 so that it can identify the gear ratio currently engaged, the gear ratio newly selected and the relationship between those gear ratios for adjusting the amount of deformation measured. This can be achieved using position sensors 70. The sensors 70 can be Hall Effect sensors, mechanical switches or optical sensors. The sensors 70 are connected to the computer processor 20 to accurately inform the processor of position of the bar sets and hence which gear ratio is engaged. It also provides additional means for controlling actuation of the selector rod 35 and provides a means of confirming that a gear change has taken place.

When an unengaged gear ratio is selected the amount of torque in the transmission changes and is determined by the gear ratio selected. For example, a lower gear (e.g. $1^{st}$ gear in a vehicle) produces more torque in the transmission than selection of a higher gear (e.g. $2^{nd}$ gear in a vehicle). When the new gear ratio is selected the torque in the transmission has to adjust from that determined by the old gear ratio to that determined by the new gear ratio. It is preferable to control the increase or decrease in torque in the transmission to provide a smoother gear transition.

This is achieved by measuring the deformation in the tail shaft casing 50 immediately after a gear change has been initiated but before the gear selection is made, and after the new gear ratio has been selected. The control system uses the known relationship between the two gear ratios to adjust the deformation measurements made. The first and second load cells 62,64 are connected to the computer processor 20. The computer processor controls the magnitude of the torque in the transmission by monitoring the amount of deformation in the tail shaft casing 50 and controlling the pressure between the clutch plates 4,6 with the clutch actuator 22 and the engine speed and torque with the throttle pots 24 to allow the torque to increase or decrease in a controlled manner, for example at a predetermined rate, to provide a smooth gear change. The control system can maintain the torque within a predetermined tolerance range of a selected value.

The control system minimises the effect of the torque spike caused when a new gear ratio is engaged by adjusting the torque to the level it was prior to the gear change so that the control system follow a torque gradient to a target torque for the new ratio.

It is also possible to calibrate the torque in the output shaft 1 with the deformation measured, which may be measured for calibration purposes only with a conventional torque sensor. Hence there is a known relationship between the amount of deformation measured and the magnitude of torque acting on the output shaft 1. However, this is not necessary for the control system to obtain smooth gear changes since it is only necessary to maintain and/or control the rate of change of torque rather than control the absolute magnitude of torque, which can be achieved by monitoring the amount of deformation in the tail shaft casing 50 as the control system adjusts the clutch pressure and throttle.

Rotational drive is transferred from the input shaft 7 to the output shaft 1 via either the first or second gear wheel pairs 15,17, with selection of the gear wheel pairs being determined by the position of the selector assembly 13. The selector assembly 13 engages first and second groups of drive formations 19,21 located on the first and second gear wheels 3,5 respectively.

Figure 3:
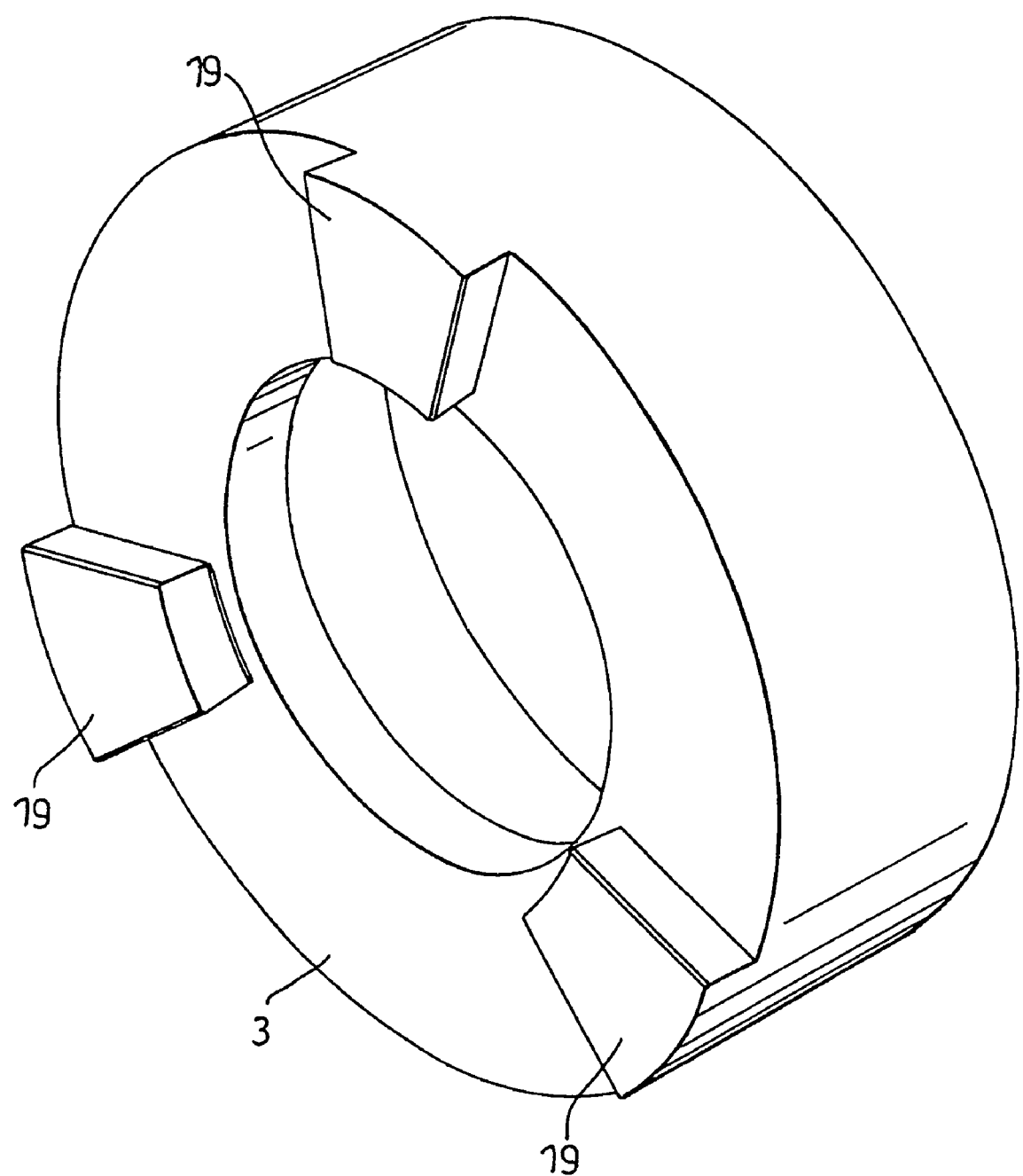
FIG. 3 illustrates the arrangement of a group of dogs on a side of a gear.

The drive formations each comprise groups of dogs. The first dog group 19 is located on one side of the first gear wheel 3. The dogs are preferably formed integrally with the first gear wheel, but this is not essential. The first dog group 19 comprises three dogs evenly circumferentially distributed about the gear face, i.e. the angle subtended between the centres of a pair of dogs is approximately 120 degrees (see FIG. 3). The second dog group 21, comprises three dogs and is similarly arranged on one side of the second gear wheel. Three dogs are used because this arrangement provides large engagement windows, that is the spaces between the dogs, to receive the selector assembly 13. Large engagement windows provide greater opportunities for the selector assembly to fully engage the gear wheels 3,5 before transmitting drive thereto. If the selector assembly 13 drives a gear wheel when only partially engaged it can lead to damage of the dogs and/or the selector assembly 13.

The first and second gear wheels 3,5 are mounted spaced apart on the output shaft 1 on roller bearings 23,25 and are arranged such that the sides including the first and second dog groups face each other.

The selector assembly 13 includes first and second sets of engagement bars 27,29 and an actuator assembly 31 in the form of a fork assembly 33 and a selector rod 35.

Figures 1D, 2:
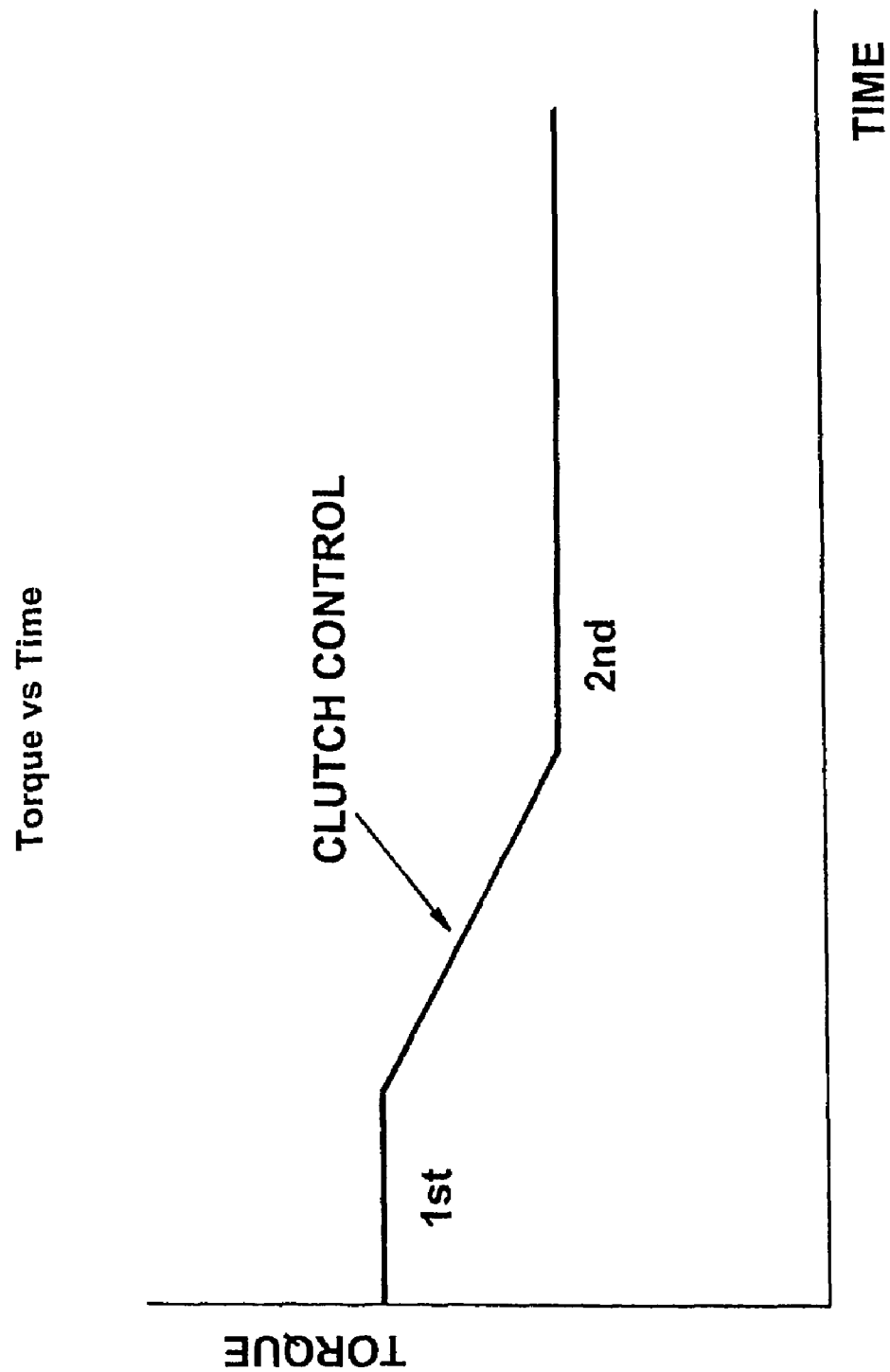
FIG. 1d is a graph of torque v time for a gear change from first to second gear.
FIG. 2 is a perspective view of part of a selector assembly.
Figure 2:
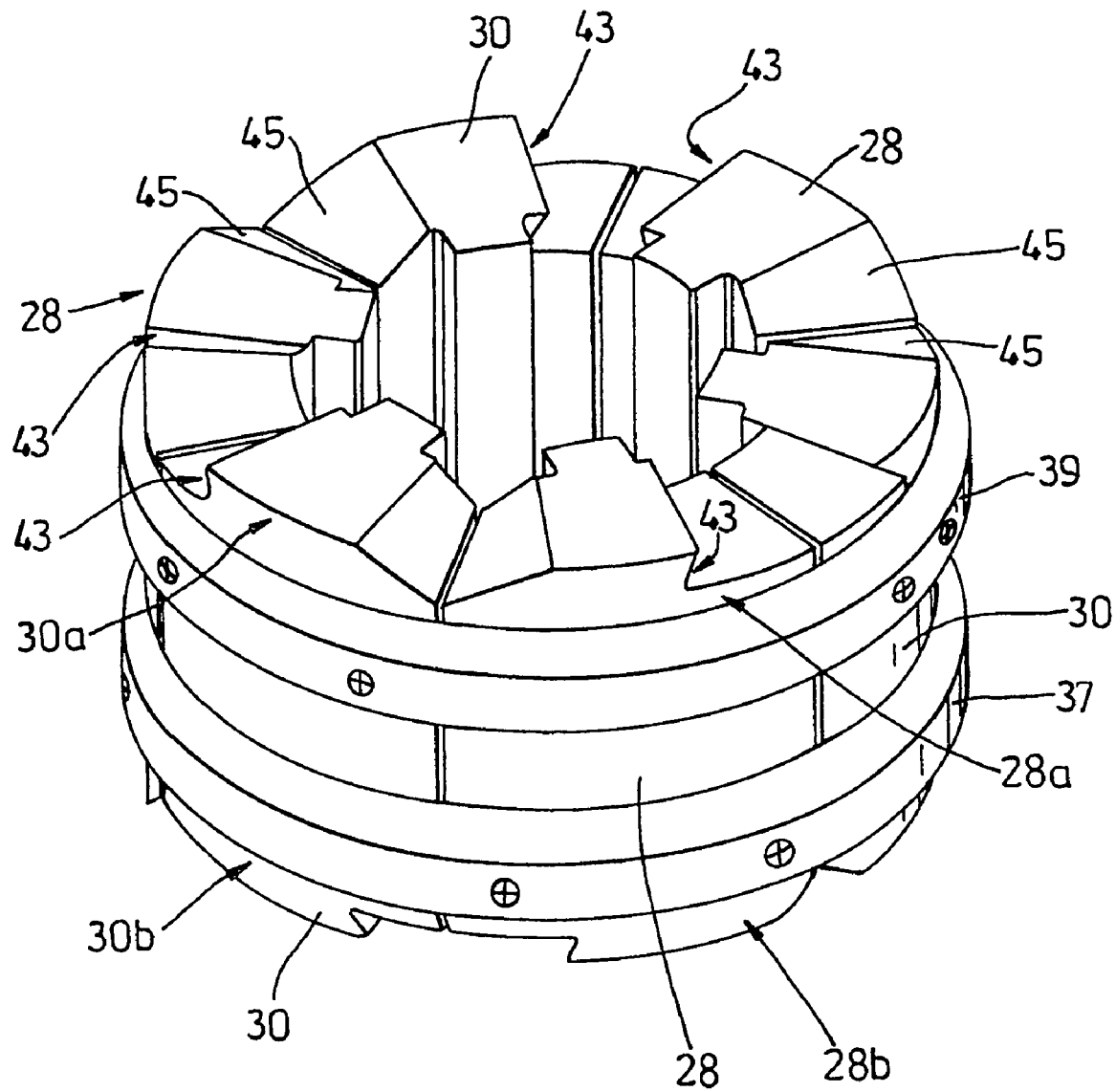

The first and second sets of engagement bars 27,29 are mounted on the output shaft 1 between the first and second gear wheels 3,5. Referring specifically to FIG. 2, the first set of engagement bars 27 comprises three bars 28 attached to a first connector ring 37, for example using grub screws. The first connector ring 37 holds the bars 28 in a fixed arrangement. The bars 28 are evenly distributed about the inner circumference of the first connector ring 37 such that their bases face inwards, and the bars 28 are arranged substantially parallel. The second set of engagement bars 29 comprises three bars 30 which are held in a similar fixed arrangement by a second connector ring 39.

The first and second engagement bar sets 27,29 are mounted on the output shaft 1 between the first and second gear wheels 3,5. The sets of engagement bars 27,29 are arranged to rotate with the output shaft 1 but are able to slide axially along the shaft in response to a switching action of the actuator assembly 31. To facilitate this, the output shaft 1 includes six keyways 41 formed in its curved surface with each engagement bar 28,30 having a complementary formation in its base. The arrangement of the bar sets 27,29 is such that bars of a particular set are located in alternate keyways 41 and the bar sets 27,29 can slide along the output shaft 1. Each bar set 27,29 moves as a unit and each bar set can move independently of the other. When there is relative movement between the first and second sets of bars 27,29, the second connector ring 39 slides over the first set of bars 27 and the first connector ring 37 slides over the second set of bars 29.

Each bar 28 in the first bar set 27 has a first end 28a arranged to engage the first group of dogs 19 attached to the first gear wheel 3 and a second end 28b arranged to engage the second group of dogs 21 on the second gear wheel 5. The first and second ends 28a,28b typically have the same configuration but are opposite handed, such that the first end 28a is arranged to engage the first group of dogs 19 during deceleration of the first gear wheel 3 and the second end 28b is arranged to engage the second group of dogs 21 during acceleration of the second gear wheel 5. Each bar 30 in the second bar set 29 is similarly arranged, except that the first end 30a is arranged to engage the first group of dogs 19 during acceleration of the first gear wheel 3 and the second end 30b is arranged to engage the second group of dogs 21 during deceleration of the second gear wheel 5.

When both the first and second sets of engagement bars 27,29 engage a gear wheel drive is transmitted from the input shaft 7 to the output shaft 1 whether the gear is accelerating or decelerating.

The first and second ends 28a,30a,28b,30b of each bar include a substantially vertical face 43 for engaging dogs 19,21 and a ramp 45 that slopes in the direction of the engagement face 43 to ensure that the bars 28,30 disengage from the dogs 19,21 to prevent the transmission from locking up. When the bars of the first and second sets 27,29 are interleaved, as in FIG. 2, the dog engagement faces 43 of the first end 28a of the first set of bars 27 are adjacent the dog engagement faces 43 of the first end 30a of the second set of bars 29. When the first and second sets of bars 27,29 are fully engaged with a gear a dog is located between each pair of adjacent engagement faces 43. The dimensions of the dogs 19,21 and the ends of the bars are preferably such that there is little movement of a dog between the engagement face 43 of the acceleration bar and the engagement face 43 of the deceleration bar when the gear moves from acceleration to deceleration, or vice versa, to ensure that there is little or no backlash in the gear.

Preferably the bars are configured to be close to the output shaft 1 to prevent significant cantilever effects due to large radial distances of loaded areas thus reducing the potential for structural failure.

Figure 4:
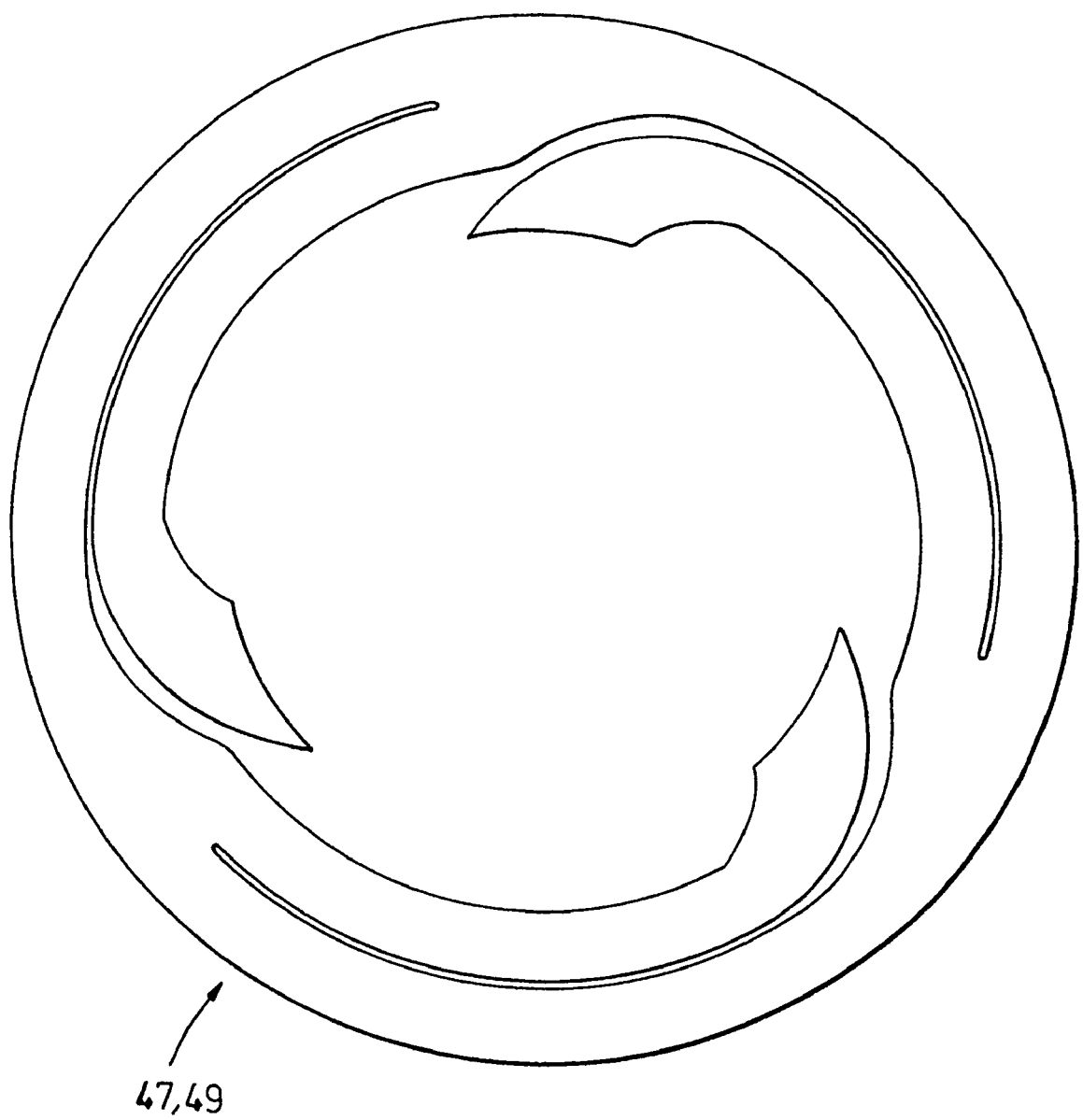
FIG. 4 is a plan view of a disc spring.

The actuator assembly 31 is arranged such that the fork assembly 33 is mounted on the selector rod 35, and the selector rod is provided parallel to the output shaft 1 and adjacent thereto. The fork assembly 33 includes a fork 46 and first and second annular disc springs 47,49 mounted about the output shaft 1 (see FIG. 1a). The first and second disc springs 47,49 have three arms, with each arm having a first part that extends circumferentially around a part of the spring and a second part that extends radially inwards (see FIG. 4).

The fork 46 has a first pair of arcuate members 51 arranged to engage the first disc spring 47. The arcuate members 51 are arranged such that the first disc spring 47 can rotate with the output shaft 1 between the arcuate members 51 and such that axial movement of the fork 46 parallel to the output shaft 1 moves the arcuate members 51 and hence the first disc spring 47 axially along the shaft if the first disc spring 47 is free to move, or biases the first disc spring 47 to move in the same direction as the fork 46 if the first disc spring 47 is unable to move. The fork 46 has a second pair of arcuate members 53 arranged to engage and act upon the second disc spring 49 in a similar manner.

The position of the fork 46 relative to the first and second gear wheels 3,5 can be adjusted by movement of the selector rod 35 in the axial direction.

The inner edges of the first disc spring 47 are fixed to the bars 28 in the first bar set 27 and the inner edges of the second disc spring 49 are fixed to the bars 30 in the second bar set 29. When the fork 46 moves, thereby moving or loading the disc springs 47,49 the engagement bar sets 27,29 are likewise moved or biased to move.

The transmission can be arranged as manual gear shift wherein gears are selected by moving a gear stick between predetermined positions (as shown in FIG. 1b), a semi-automatic transmission wherein the driver initiates a gear change by controlling electronic switches, for example paddles mounted adjacent the steering wheel, or fully automatic wherein the control system causes the transmission system to change gear according to certain predetermined conditions, including for example engine speed and torque.

The processes of selecting a higher gear (i.e. second gear wheel pair 17) when a vehicle is accelerating (so called up shift) and a lower gear (i.e. first gear wheel pair 15) when the vehicle is decelerating (so called breaking down shift) using the control system will now be described with reference to FIGS. 5a-5f which for clarity illustrate diagrammatically the movement of the first and second bar sets 27,29 by the relative positions of only one bar from each set, FIGS. 1a-c and FIGS. 6 to 9.

Figure 5A:
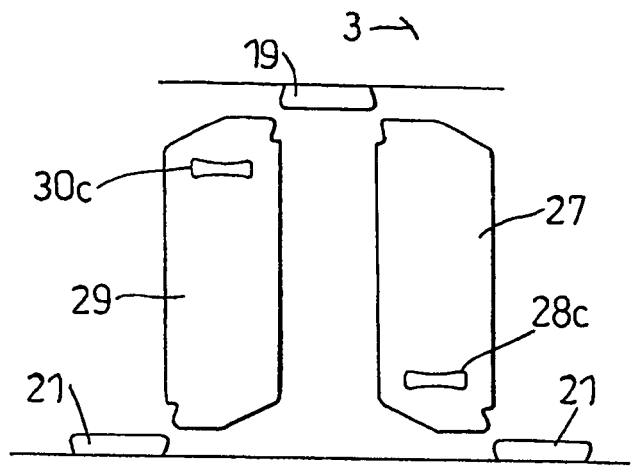
FIGS. 5a-f illustrate diagrammatically operation of the selector assembly.
Figure 5B:
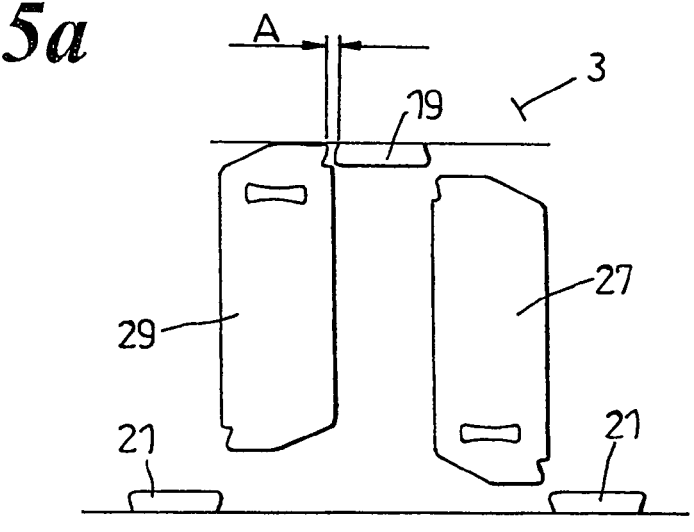
Figure 5C:
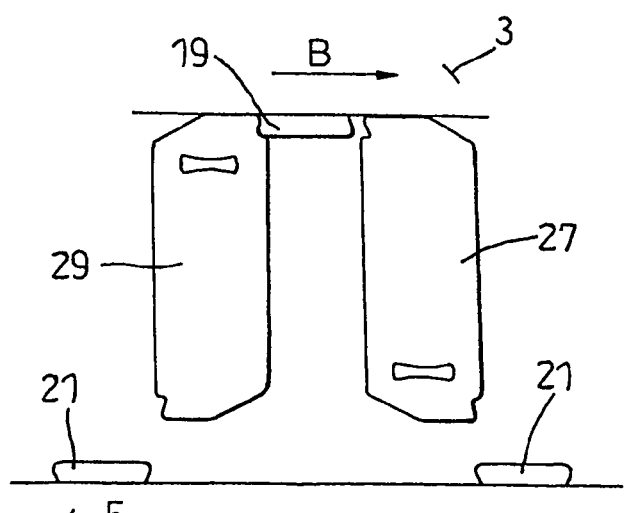

FIG. 5c shows a condition when the first gear wheel 3 is fully engaged, that is, the bars 28,30 are interleaved with the first group of dogs 19. The selector rod 35 is located such that the fork 46 maintains the first and second bar sets 27,29 in engagement with the first gear wheel 3. Accordingly, drive is transferred to the output shaft 1 via the first gear wheel pair 15 by the first bar set 27 when decelerating and the second bar set 29 when accelerating.

Whilst accelerating (first gear wheel 3 rotating in the direction of arrow B in FIG. 5c) using the first gear wheel pair 15, the engagement faces 43 of the bars of the first bar set 27 are not loaded, whilst the engagement faces 43 of the bars of the second bar set 29 are loaded. When a user, or the control system, initiates selection of the second gear wheel pair 17, the computer processor takes measurements from the first and second load cells 62,64 and compares the values measured. If the value measured by the second load cell 64 is greater than that measured by the first load cell 62 this indicates to the control system that the engine is accelerating and the gear change is allowable. The processor 20 then sends control signals to the clutch actuator 22 to adjust the pressure between the first and second clutch plates 4,6. The rotational speed of each clutch plate is measured by the clutch plate sensors 16,18. Whilst the clutch plates are fully engaged the sensors 16,18 will show that they are rotating at the same speed. As the pressure between the clutch plates 4,6 reduces a condition will be reached where the torque transmitted by the clutch 2 will overcome the friction between the first and second plates 4,6 causing the first and second plates 4,6 to move relative to each other (onset of slip B see FIG. 7). The computer processor 20 will detect the onset of slip when there is a measured difference between the rotational speeds of the first and second clutch plates 4,6. The processor 20 then instructs the actuator 22 to maintain this pressure (the "slip pressure").

After the computer processor 20 has measured deformation prior to the shift, the processor 20 calculates the amount by which the measurement from the load cells 62,64 needs to be adjusted to cause the torque value in the transmission to match the torque prior to the shift when the new ratio is engaged (each ratio causes a different reading in the load cells 62,64 even when output torque is maintained during a shift as the moment forces change due to the different axial position, gear diameter, and ratio of each gear). This becomes the first target value upon engagement of the new ratio.

Figure 5D:
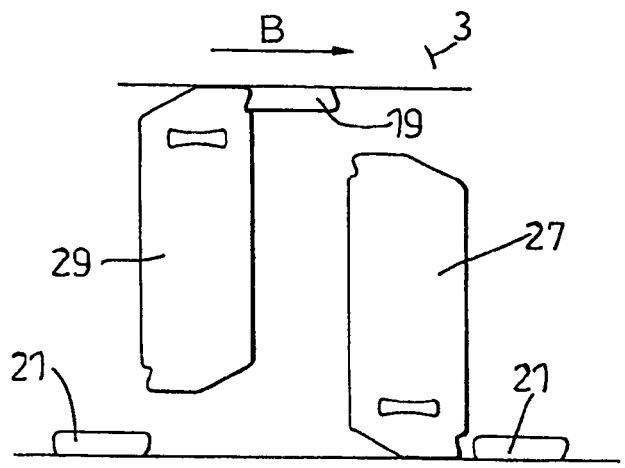

The processor 20 sends control signals to actuate the selector rod 35 such that the fork 46 acts on the first disc spring 47, causing the bars of the first bar set 27 to slide axially along the keyways 41 in the output shaft 1 thereby disengaging the bars from the first gear wheel 3 (see FIG. 5*d*).

The fork 46 also acts on the second disc spring 49 to bias the bars of the second bar set 29 to move towards the second gear wheel 5. However, because the bars of the second bar set 29 are loaded, i.e. are driving the first gear wheel 3, they cannot be disengaged from the first gear wheel 3, and therefore the bars of the second bar set 29 remain stationary.

When the bars of the first bar set 27 slide axially along the output shaft 1, the engagement faces 43 engage the second group of dogs 21 (see FIG. 5*e*) on the second gear wheel 5. As this occurs the rotation of the second gear wheel 5 is substantially instantaneously locked to the rotation of the output shaft 1 which generates a torque spike in the transmission. The torque spike causes substantial slip between the first and second clutch plates 4,6 since the clutch plates 4,6 were being maintained at the slip pressure, thus dissipating the energy in the torque spike. At the same time the computer processor 20 measures the amount of deformation in the tail shaft casing 50, and sends control signals to the clutch actuator 22 and to the throttle pots 24 to adjust the pressure between the first and second clutch plates 4,6 and to adjust the speed and torque of the engine 10 to cause the deformation measured by the load cells 62,64 to adjust to the final target value for the new ratio in a controlled manner, for example at a predetermined rate. The control system prioritises restoring the clutch 2 to full pressure to limit clutch wear and adjusts the engine speed and torque to allow this to happen, without exceeding the target load cell value at any time until the final target value is reached. When the clutch 2 is fully engaged control of the throttle is then returned to the driver as quickly as possible without exceeding the target load cell value set tolerances at any time until the final target value for the new ratio is achieved whereupon throttle is returned to driver control and the clutch is restored to full in gear pressure.

Figure 5E:
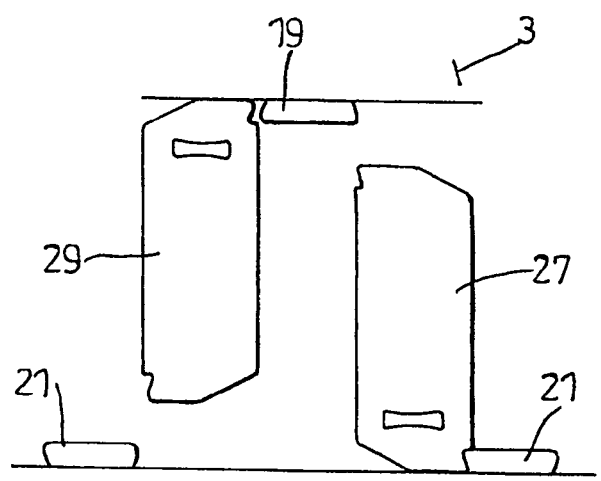
Figure 5F:
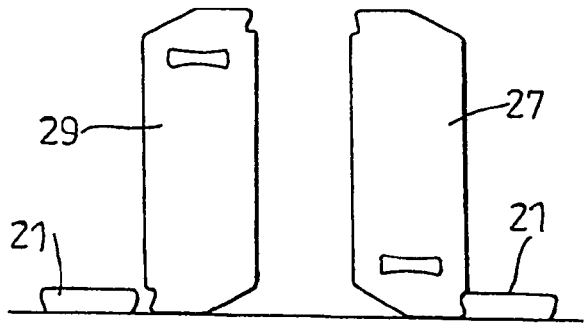
Figure 6:
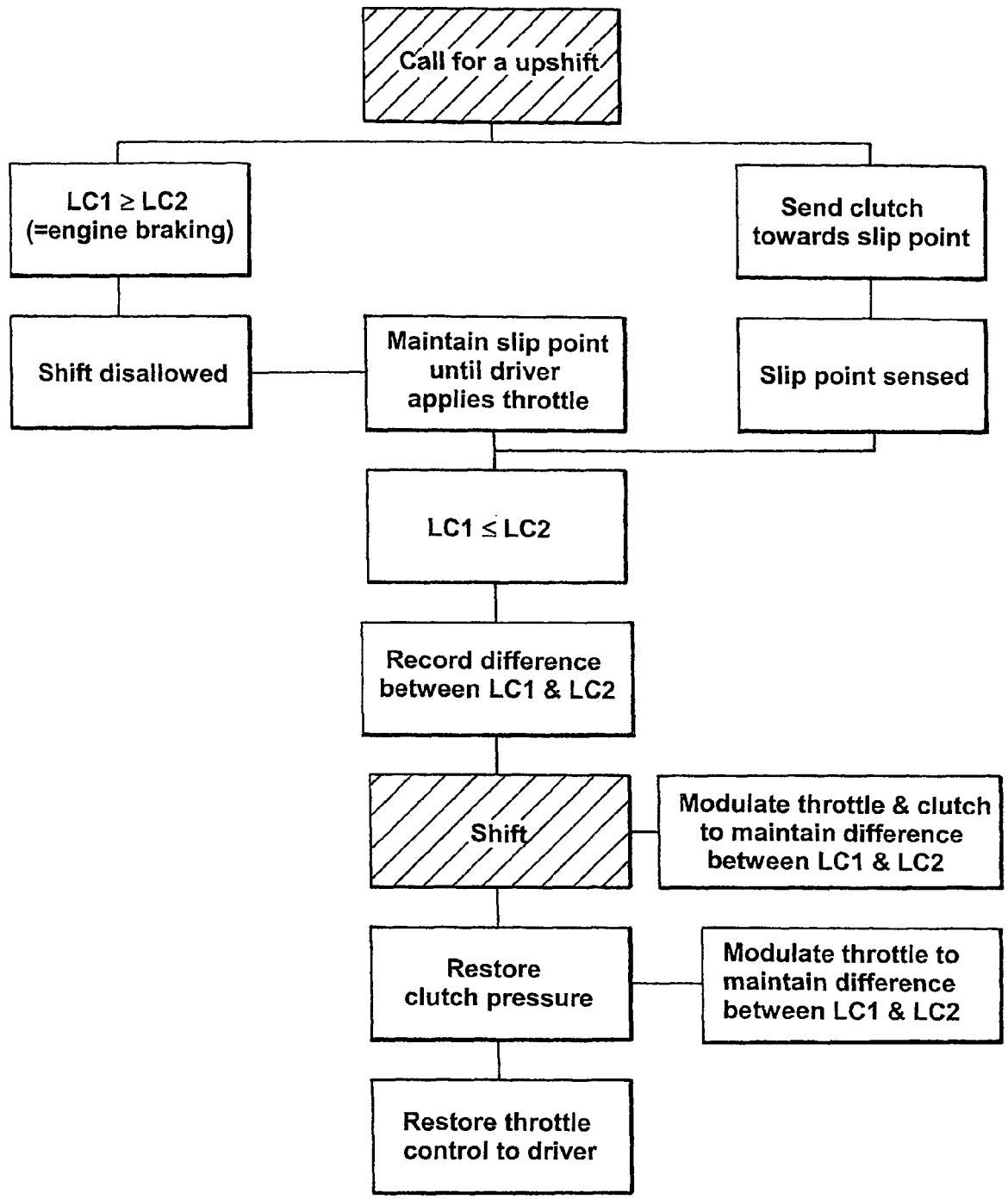
FIG. 6 is a schematic showing operation of the control system when selecting a higher gear.
Figure 7:
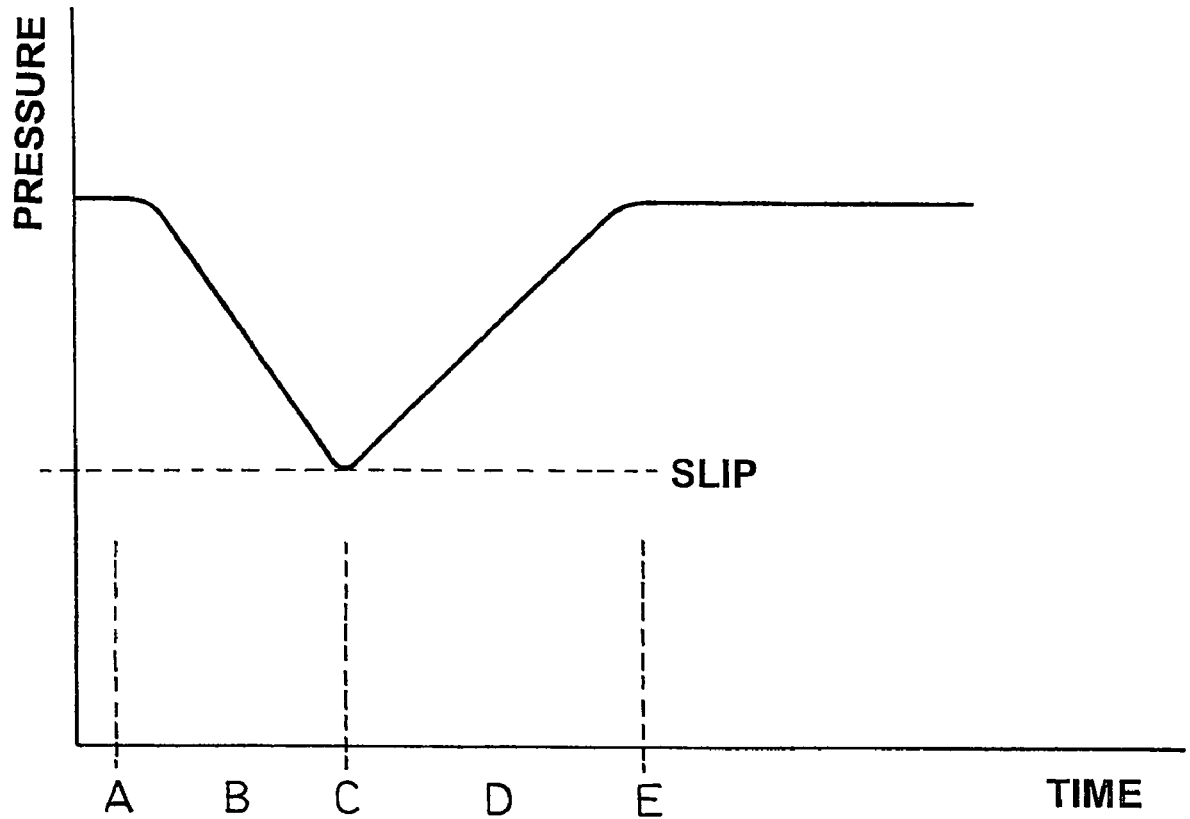
FIG. 7 is a graph showing clutch pressure against time.
Figure 8:
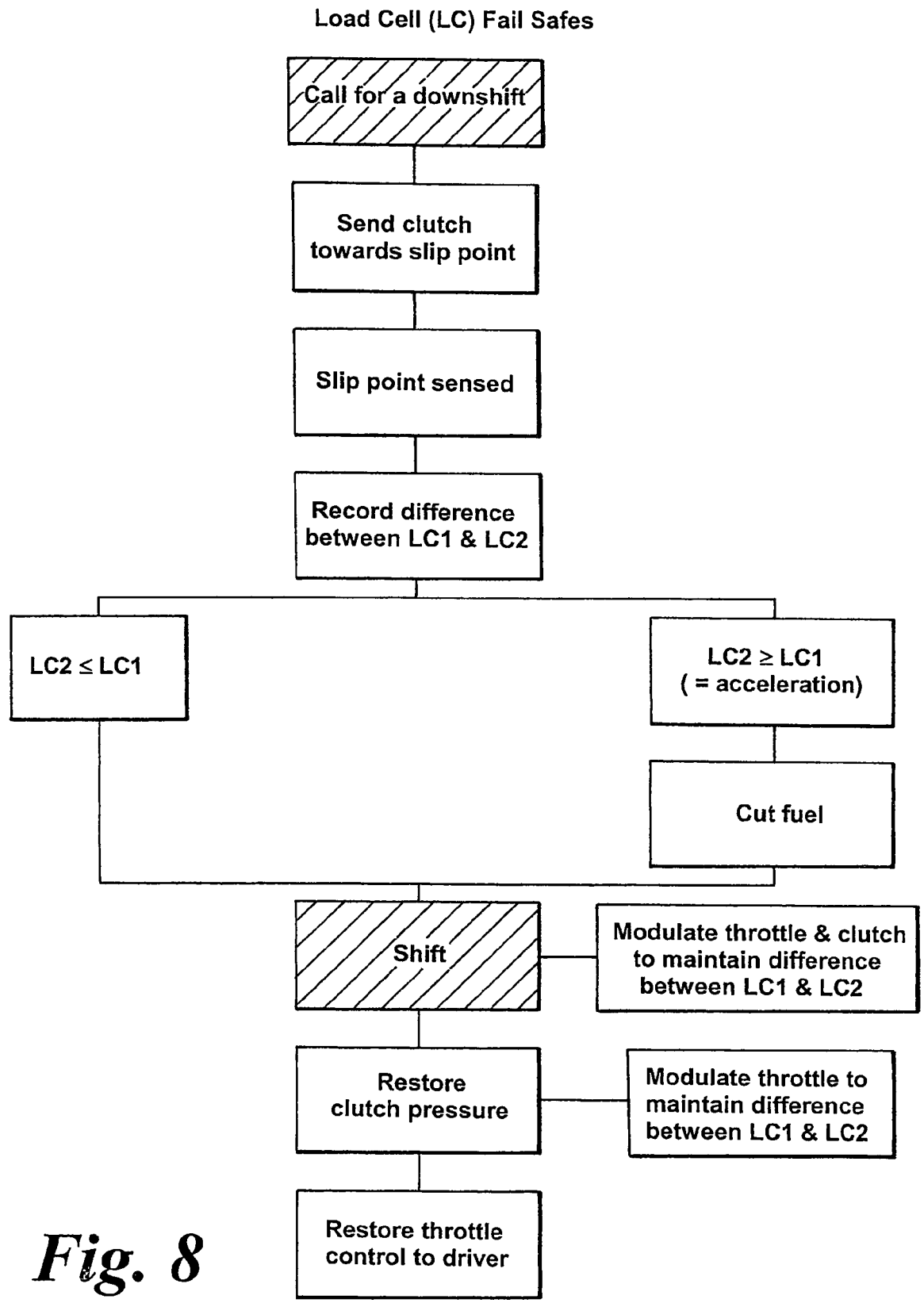
FIG. 8 is a schematic showing operation of the control system when selecting a lower gear.

The bars of the first bar set 27 then begin to drive the second gear wheel 5 in the direction of Arrow C in FIG. 5*e* and energy is transmitted from the output shaft 1 to the input shaft 7 by way of the second gear wheel pair 17. As this occurs, the bars of the second bar set 29 cease to be loaded, and are free to disengage from the first group of dogs 19. Since the second disc spring 49 is biased by the fork 46, the bars of the second bar set 29 slide axially along the keyways 41 in the output shaft 1 thereby completing the disengagement of the first gear wheel 3 from the output shaft 1. The bars of the second bar set 29 slide along the keyways 41 in the output shaft 1 until they engage the second gear wheel 5, thereby completing engagement of the second gear wheel 5 with the output shaft 1 (see FIG. 5*f*). This method of selecting gear wheel pairs substantially eliminates torque interruption since the second gear wheel pair 17 is engaged before the first wheel pair 15 is disengaged, thus momentarily, the first and second gear wheel pairs 15,17 are simultaneously engaged.

When a gear wheel is engaged by both the first and second bar sets 27,29 it is possible to accelerate or decelerate using a gear wheel pair with very little backlash occurring when switching between the two conditions. Backlash is the lost motion experienced when the dog moves from the engagement face 43 of the acceleration bar to the engagement face 43 of the deceleration bar when moving from acceleration to deceleration, or vice versa. A conventional dog-type transmission system has approximately 30 degrees of backlash. A typical transmission system for a car in accordance with the current invention has backlash of less than four degrees.

Backlash is reduced by minimising the clearance required between an engagement bar and a dog during a gear shift: that is, the clearance between the dog and the following engagement bar (see measurement 'A' in FIG. 5*b*). The clearance between the dog and the following engagement bar is in the range 0.5 mm-0.03 mm and is typically less than 0.2 mm. Backlash is also a function of the retention angle, that is, the angle of the engagement face 43, which is the same as the angle of the undercut on the engagement face of the dog. The retention angle influences whether there is relative movement between the dog and the engagement face 43. The smaller the retention angle, the less backlash that is experienced. The retention angle is typically between 2.5 and 15 degrees, and preferably is 15 degrees.

Transition from the second gear wheel pair 17 to the first gear wheel pair 15 whilst decelerating is achieved by a similar process.

Whilst decelerating in the second gear wheel pair 17 the engagement surfaces 43 of the bars of the first bar set 27 are not loaded, whilst the engagement surfaces 43 of the bars of the second bar set 29 are loaded. When a driver or the control system initiates a gear change to engage the first gear wheel pair 15, the processor 20 sends control signals to the clutch actuator 22 to adjust the pressure between the first and second clutch plates 4,6. The speed of each clutch plate 4,6 is measured by the clutch plate sensors 16,18. Whilst the clutch plates 4,6 are fully engaged the sensors will show that they are rotating at the same speed. As the pressure between the clutch plates 4,6 reduces a condition will be reached where the torque transmitted by the clutch will overcome the friction between the first and second plates 4,6 causing the first and second plates to move relative to each other (onset of slip B see FIG. 7). The computer processor 20 will detect the onset of slip when there is a measured difference between the rotational speeds of the first and second clutch plates. The processor then instructs the actuator 22 to maintain the pressure at the slip pressure. The processor then takes measurements from the first and second load cells 62,64 and compares the values measured. The computer processor 20 records the amount of deformation in the tail shaft casing 50 and the direction of the torque.

After the computer processor 20 has measured deformation prior to the shift, the processor 20 calculates the amount by which the measurement from the load cells 62,64 needs to be adjusted to cause the torque value in the transmission to match the torque prior to the shift when the new ratio is engaged (each ratio causes a different reading in the load cells 62,64 even when output torque is maintained during a shift as the moment forces change due to the different axial position, gear diameter, and ratio of each gear). This becomes the first target value upon engagement of the new ratio.

If the value measured by the first load cell 62 is greater than the second load cell 64 this indicates that the engine 10 is decelerating and an engine braking down shift has been initiated. The processor then sends control signals to actuate the selector rod 35 such that the fork 46 slides axially relative to the output shaft 1. The fork 46 acts on the first disc spring 47 attached to the first bar set 27, causing the bars of the first bar set 27 to slide axially in the keyways 41 along the output shaft 1 in the direction of the first gear wheel 3, thereby disengaging the first bar set 27 from the second gear wheel 5.

The fork 5 also acts on the second disc spring 49 but since the bars of the second bar set 29 are loaded, i.e. they are drivingly engaged with the dogs 21 on the second gear wheel, the second bar set 29 remains stationary, however the second disc spring 49 is biased by the fork 46 to move the second bar set 29 towards the first gear wheel 3.

As the bars of the first bar set 27 slide axially in the keyways 41, the bars 28 engage the dogs 19 on the first gear wheel 3. As this occurs the rotation of the first gear wheel 3 is substantially instantaneously locked to the rotation of the output shaft 1 which generates a torque spike in the transmission. The torque spike causes substantial slip between the first and second clutch plates 4,6 since the clutch plates were being maintained at the slip pressure, thus dissipating the energy in the torque spike. At the same time the computer processor 20 measures the amount of deformation in the tail shaft casing 50, and sends control signals to the clutch actuator 22 and to the throttle pots 24 to adjust the pressure between the first and second clutch plates 4,6 and to adjust the speed and torque of the engine 10 to cause the deformation measured by the load cells 62,64 to adjust to the final target value for the new ratio in a controlled manner, for example at a predetermined rate. The control system prioritises restoring the clutch 2 to full pressure to limit clutch wear and adjusts the engine speed and torque to allow this to happen, without exceeding the target load cell value at any time until the final target value is reached. When the clutch 2 is fully engaged control of the throttle is then returned to the driver as quickly as possible without exceeding the target load cell value set tolerances at any time until the final target value for the new ratio is achieved whereupon throttle is returned to driver control and the clutch is restored to full in gear pressure.

When the bars 28 engage the dogs 19 on the first gear wheel 3 they begin to drive the first gear wheel 3 such that energy is transmitted from the input shaft 7 to the output shaft 1 by way of the first gear wheel pair 15. As this occurs, the bars of the second bar set 29 cease to be loaded. The second disc spring 49 acts on the bars of the second bar set 29, causing it to slide axially within the keyways 41 along the output shaft 1 towards the first gear wheel 3, thereby completing disengagement of the second gear wheel 5. The second bar set 29 continues to slide within the keyways 41 along the output shaft 1 until it engages the first gear wheel 3, thereby completing engagement of the first gear wheel 3 with the output shaft 1.

If the second load cell 64 has a higher value than the first load cell 62 there is engine acceleration and the driver/control system is trying to perform a kick down gear change, that is a gear shift from a higher gear to a lower gear to accelerate the vehicle, for example when a vehicle is travelling up a hill and the driver selects a lower gear to accelerate up the hill. In this instance the engagement surfaces 43 of the bars of the second bar set 29 are not loaded, whilst the engagement surfaces 43 of the bars of the first bar set 27 are loaded. Under these circumstances it is not possible to engage the new gear until the previous ratio is fully disengaged. To achieve this, the computer processor 20 momentarily cuts the fuel supply to the engine to allow the previous gear ratio to fully disengage before engaging the lower gear. The control system then uses the engagement bars of the second bar set 29 to engage the first gear wheel 3 in a similar manner as described above. The gear change is then made in a similar fashion to the engine braking down shift.

FIG. 5a shows the first and second bar sets 27,29 in a neutral position, that is, neither bar set is engaged with a gear wheel, the engine is idling. FIG. 5b shows the first and second bar sets moving into engagement with the first gear wheel 3 under the action of the fork 46. The process of moving from a neutral position into engagement with the first gear wheel 3 is substantially the same as an accelerating up shift.

Use of the transmission system leads to improved performance, lower fuel consumption and lower emissions since drive interruption has substantially been eliminated. Also the system is a more compact design than conventional gearboxes leading to a reduction in gearbox weight. The control system reduces the effects of torque spikes by preventing shockwaves from propagating throughout the transmission, leading to smooth gear changes.

It will be appreciated by the skilled man that various modifications can be made to the above embodiment that are within the scope of the current invention, for example a plurality of selector assemblies can be mounted on the output shaft with corresponding pairs of gear wheels to provide a larger number of gear ratios between the output shaft and the input shaft. It is also possible to have transmission systems with more than two shafts to provide additional gear ratios.

A torque converter can be used instead of a clutch, or in combination with a clutch or in combination with a plurality of clutches. For example, the output from an engine can be connected in series to a torque converter and then to a clutch. Alternatively, the output from an engine can be connected in series with a torque converter and then in parallel to a network of clutches. The term clutch means should be understood to include all of the above-mentioned combinations.

The load cells may be mounted on the gearbox casing or some other component or assembly that supports or houses rotatable transmission components.

Figure 9:
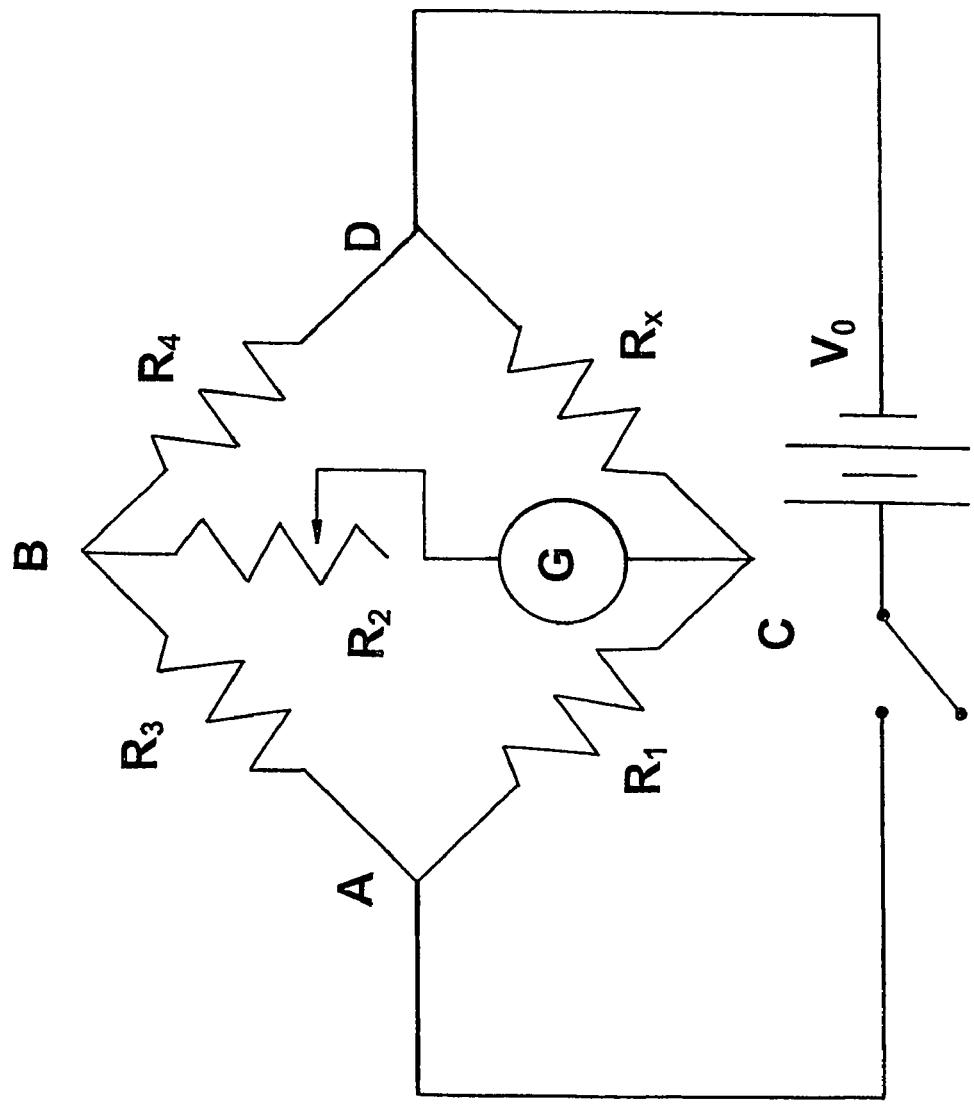
FIG. 9 shows a circuit diagram for a strain gauge.

FIG. 9 shows a strain gauge 66 and a Wheatstone bridge circuit 68 that can be used to measure the magnitude of torque in the output shaft 1. The strain gauge 66 works on a similar principle to the load cells in that it measures strains in components or assemblies that house or support rotatable transmission components along the torque load path such as bearing casings, bearing mountings, the gearbox casing 34, the gearbox casing end plates 36,38, the bolts used to attach the endplates 36,38 to the gearbox casing 34 and the tail shaft casing 50. Strain gauges 66 may also be located on a differential.

Strain is the ratio of the change in a dimension to the original dimension. The strain gauge 66 is fixedly attached to a component or assembly that houses or supports rotatable transmission components for example by using a cement or adhesive. Any distortion in the component/assembly caused by torque within the transmission will also cause a distortion of the strain gauge 66. The gauge 66 contains conducting material and the distortion therefore results in a change in its resistance. By measuring this change in resistance the strain can be determined. The change in resistance is measured through the Wheatstone bridge circuit 68. This has 4 arms, arranged in a square. Each arm contains either a resistor 70 of known resistance, or a strain gauge 66—strain gauges will occupy one, two or four of the arms.

Taking the case of one strain gauge 66 in the Wheatstone bridge, a so called quarter bridge arrangement, power lines are connected to opposite corners of the bridge, see A and C in FIG. 9, to provide an excitation voltage. A measurement is made across the other corners of the bridge, see B and D in FIG. 9. If the resistance of the strain gauge changes, the current across the bridge will change (according to Ohms law, V=IR). This change is measured and the amount of strain can be determined.

The magnitude of the strain detected in those components or assemblies is proportional to the magnitude of the torque in the output shaft 1 and therefore the strain gauge 66 can be calibrated in a similar way to the load cells 62,64 for example by using a conventional torque sensor. If more than one strain gauge is used it is possible to determine the direction of the torque.

Sensors 72 can be used to measure the relative rotational speeds and/or the relative rotational positions of the sets of engagement bars and the gear wheel to be engaged. This enables the control system to control the movement of the engagement bars such that the engagement bars do not crash into the dogs on gear wheels but rather engage the gear wheels by entering into the spaces between the dogs. This substantially reduces the amount of wear to the dogs and the engagement bars. The detectors can be Hall Effect sensors, optical sensors or any other suitable type of sensor for determining the rotational speed or position of a body.

Rather than using a throttle pots mechanism 24 for controlling the speed of the engine, an engine control unit 74 can be used to prevent certain pistons from firing and thereby reducing the output of the engine.

The sensors 70,72 for detecting the positions and/or rotational speeds of the sets of engagement bars the gear wheels can be used in conjunction with the engine control unit 74 to prevent a piston, or a plurality of pistons, from firing at the time when the engagement bars engage the dogs on the side of a gear wheel. This momentarily reduces the amount of torque in the transmission at the instant when the engagement bars contact the dogs and thereby reduces the effect of torque spikes in the transmission. The torque in the transmission at that instant is then largely be due to the inertia of the transmission components. The timing of the misfiring of a piston is accurately controlled by the computer processor 20 in response to position and/or speed measurements made by the sensors 70,74.

Optionally, the control system can include a traction control mechanism (not shown) to prevent wheel spin.

Figure 10:
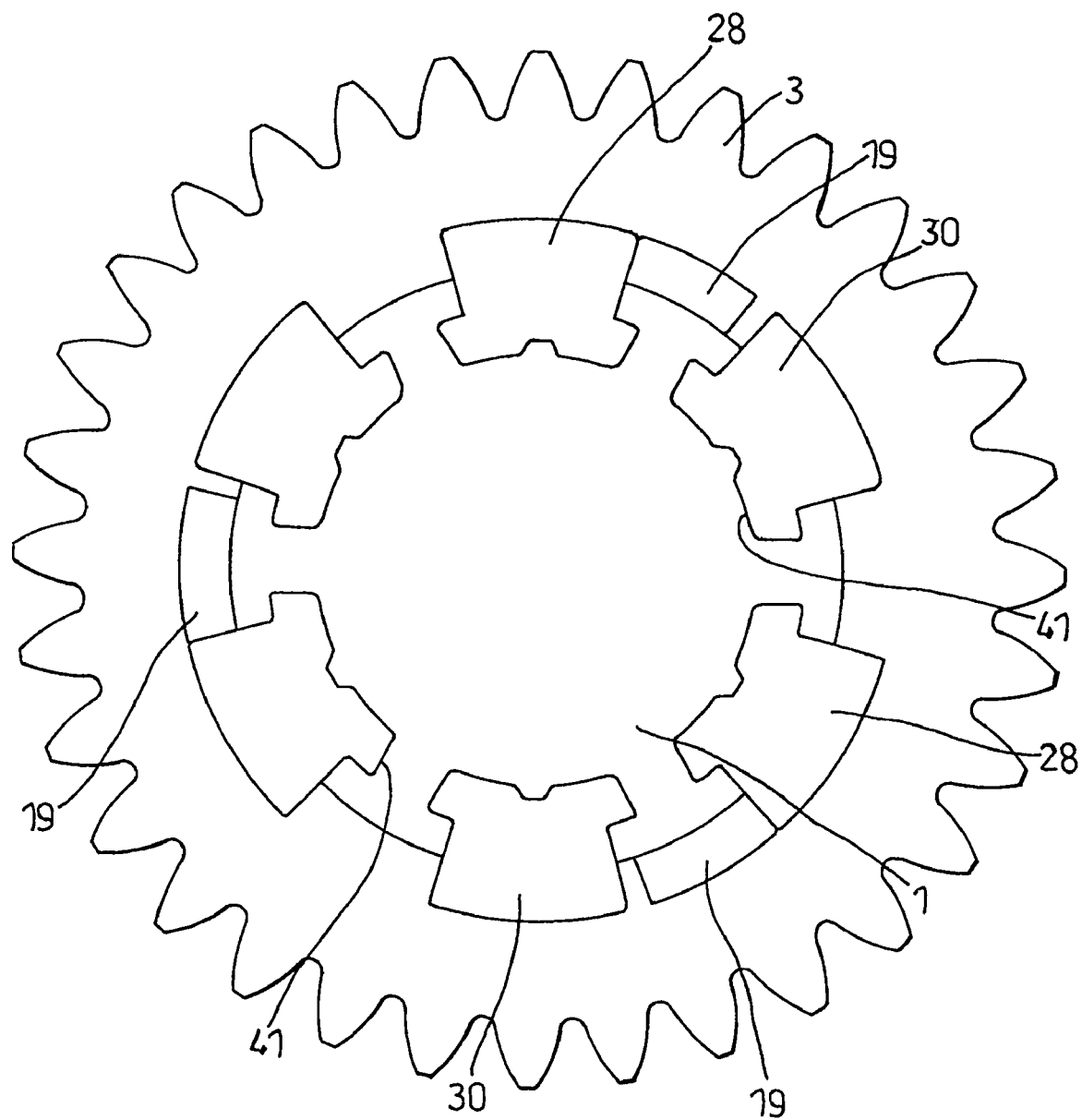
FIG. 10 is a sectional view of an output shaft showing an alternative arrangement for attaching the engagement bars to the output shaft.

The keyways 41 can be arranged to have dovetailed profiles such that the bars are radially restrained within the keyways (see FIG. 10). Alternatively, the keyways can have a slotted or T-shaped profile to radially restrain the bars. This provides a significant advantage since it obviates the need for the first and second connector rings 37,39 to connect the bars together in the first and second bar sets. This arrangement is preferred since it provides an improved means of restraining the radial position of the bars 28,30 relative to the output shaft 1, leading to greater structural integrity of the transmission system. Since the connector rings 37,39 are no longer required it is possible to reduce the length of the engagement bars 28,30 thereby producing more compact transmission systems. The alternative keyways can be formed in the output shaft 1 or can be formed in a separate component from the output shaft which is then fixedly attached to the output shaft, for example by using a splined arrangement.

Figure 11:
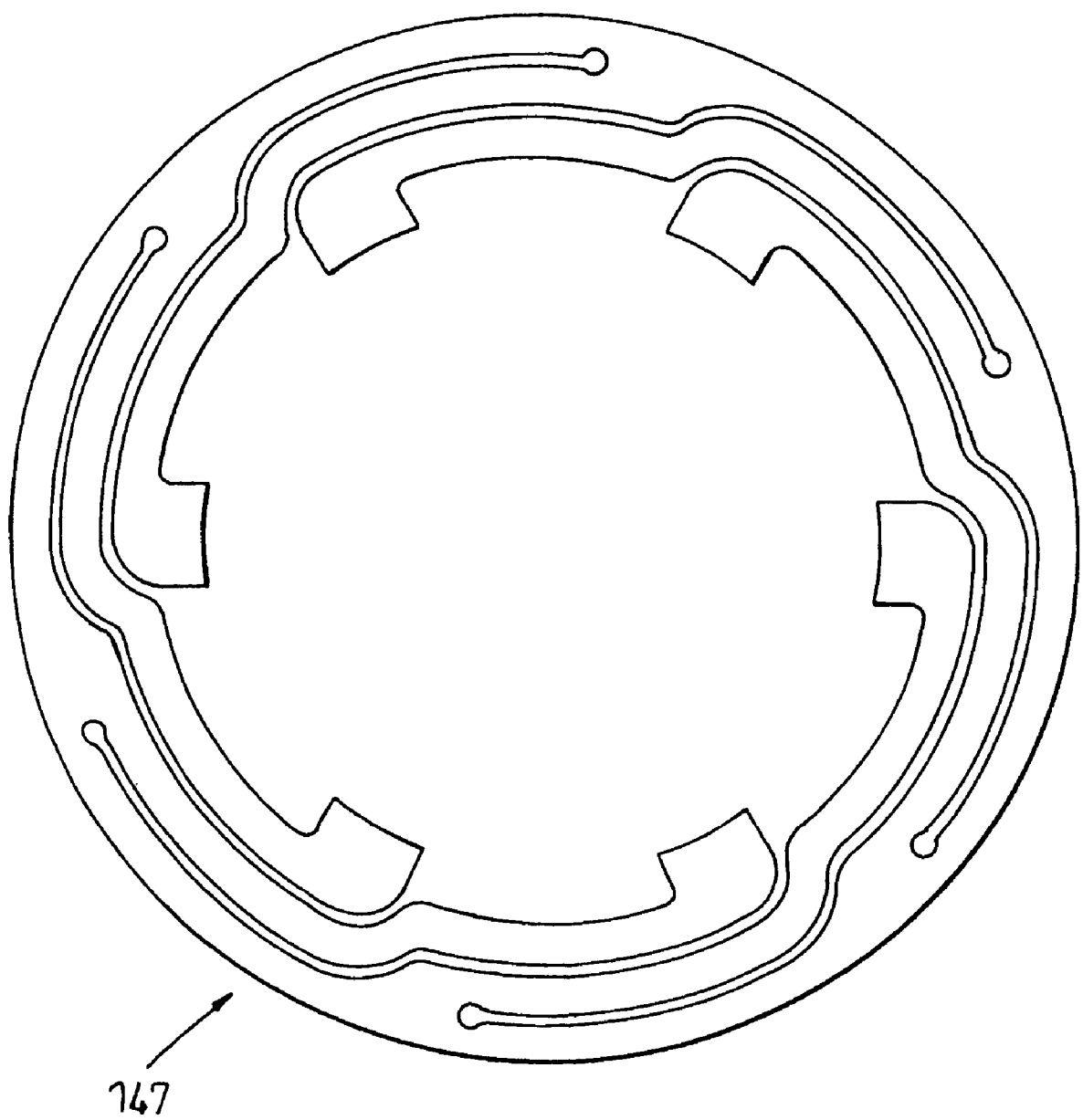
FIG. 11 is a plan view of a disc spring for a second embodiment of the invention.

Furthermore, it allows embodiments of the invention to be used having only one disc spring 147 (see FIG. 11) connecting all six bars together, i.e. bars from the first and second sets, with the actuator arrangement being adapted accordingly. In use, three of the bars would be loaded when the first gear is accelerating and three not loaded, and moving the fork to bias the disc spring towards the second gear will move the three unloaded bars out of engagement with the first gear wheel, leaving three bars still in engagement. Once the bars have engaged with the second gear wheel, the remaining three bars will disengage from the first gear wheel, and under the loading of the disc spring move into engagement with the second gear wheel. This configuration provides a highly compact arrangement leading to smaller, lighter gearboxes.

The axial space between the first and second gears to accommodate the selector assembly may be reduced to around 20 mm for typical road car applications.

FIG. 5a shows a recesses 28c in the top of each bar of the first bar set and a recess 30c in the top of a bar from the second bar set. The recesses 28c,30c allow connections to be made between the bars of the first and second bar sets 27,29 with the arms of the first and second disc springs 47,49 respectively. The shape of the recesses 28c,30c is such that the recesses allow each spring arm to move to a non-perpendicular angle relative to the bars 28,30 during a gear shift. The recesses 28c,30c shown in FIG. 5a are for a two disc spring configuration. For embodiments having only one disc spring 147 the recesses 28c,30c are located more centrally along the length of the bars 28,30.

When a ring is not used to fix the positions of the bars in a set, the bars in a set can move a small amount relative to each other in the axial direction. This is because the only connection between the bars in a set is provided by a deformable disc spring. A single bar is attached to each disc spring arm and each arm can deform independently of the others, thereby allowing the relative movement between the bars. The bars in a set will nevertheless essentially move in unison.

The number of dogs on each of the gear wheels is not limited to three, for example any practicable number of dogs can be used. It has been found that two to eight dogs are suitable for most applications. Similarly, the number of bars in a bar set can be any practicable number but most preferably the number of bars in a set equals the number of dogs in a group.

It will also be appreciated by the skilled person that the transmission system can be adapted such that the selector assembly and the first and second gear wheels are mounted on the input shaft and the fixed gear wheels are mounted on the output shaft.

INDUSTRIAL APPLICABILITY

The transmission system can be used in any vehicle for example, road cars, racing cars, lorries, motorcycles, bicycles, earth removal vehicles such as bulldozers, cranes, military vehicles, aircraft such as aeroplanes and helicopters, watercraft such as boats, ships and hovercrafts. The system can also be used in any machine that has first and second rotatable bodies wherein drive is to be transmitted from one of the rotatable bodies to the other, for example in lathes and milling machines.

The invention claimed is:

1. A transmission comprising a plurality of gear ratios, a selector assembly for selectively engaging the gear ratios, a clutch device for selectively transmitting drive from a drive source to the transmission, and a control system for controlling a clutch torque limit, said control system being constructed and arranged to automatically adjust a clutch torque limit value before the selector assembly selects an unengaged gear ratio when shifting between gear ratios, to allow relative rotational movement between input and output sides of the clutch device if the torque exceeds a predetermined value when the unengaged gear ratio is engaged by the selector assembly, wherein the transmission is arranged such that selection of a new gear ratio takes place almost instantaneously without substantial power interruption.

2. A transmission according to claim 1, further comprising a sensor system arranged to detect the operational status of the clutch device and an actuator for controlling the clutch torque limit, wherein the actuator is adapted to reduce the clutch torque limit until the sensor system detects a predetermined operational status before selecting an unengaged gear ratio.

3. A transmission according to claim 1, wherein the clutch device is arranged to increase the clutch torque limit when a new gear ratio has been selected.

4. A transmission according to claim 1, further including a sensor device for sensing a position of the selector assembly within the transmission.

5. A transmission according to claim 1, further including a sensor device for sensing relative rotational positions of a gear wheel and the selector assembly and means for controlling engagement of the gear wheel by the selector assembly according to the sensed rotational positions.

6. A transmission according to any claim 1, wherein the clutch device is a clutch, a torque converter, or a torque converter in combination with a clutch.

7. A transmission according to claim 1, wherein the control system is arranged to measure or estimate and record a torque in the transmission before an unengaged gear ratio is selected and to estimate the torque in the transmission after a new gear ratio has been selected.

8. A transmission according to claim 1, further comprising means for measuring or estimating and recording the torque in the transmission before an unengaged gear ratio is selected and for estimating the torque in the transmission after the new gear ratio has been selected.

9. A transmission according to claim 1, wherein the clutch device includes the input side and the output side and the control system is arranged to reduce the clutch torque limit until the input and output sides of the clutch device slip before the selector assembly selects an unengaged gear ratio.

10. A transmission according to claim 9, further comprising a sensor system arranged to detect slip between the input and output sides of the clutch device, and wherein the actuator for controlling the clutch torque limit reduces the clutch torque limit until the sensor system detects slip between the input and output sides of the clutch device before selecting an unengaged gear ratio.

11. A transmission according to claim 9, wherein the clutch device is arranged to increase the clutch torque limit when a new gear ratio has been selected.

12. A transmission according to claim 1, wherein the control system is arranged to control speed and torque of the drive source.

13. A transmission according to claim 12, wherein the control system includes an engine control unit arranged to adjust an engine output when the selector assembly engages a new gear ratio.

14. A transmission according to claim 12, wherein the control system is arranged to increase or decrease the speed and torque of the drive source to control output torque of the transmission when a new gear ratio is selected.

15. A transmission according to claim 1, wherein the control system is arranged to predict a target torque at the completion of a shift control sequence and approach the target torque at a predetermined gradient until the target torque is met.

16. A transmission according to claim 15, wherein the clutch device is restored to a condition prior to instigation of the shift before the target torque is met.

17. A transmission according to claim 15, wherein the clutch device is restored to a condition prior to instigation of the shift before the target torque is met.

18. A transmission according to claim 1, wherein the control system further comprises means for measuring deformation caused by torque in the transmission in at least one static component or assembly that is deformed due to torque in the transmission, and means for controlling the torque in the transmission, wherein the control system is arranged to measure deformation and to adjust the torque in the transmission according to the measured deformation and a known relationship between the gear ratios.

19. A transmission according to claim 18, wherein the means for controlling torque in the transmission includes the clutch device.

20. A transmission according to claim 18, wherein the means for controlling torque in the transmission includes means for controlling the speed of the drive source.

21. A transmission according claim 18, wherein the control system further comprises means for calculating the magnitude of torque in the transmission system.

22. A transmission according to claim 18, wherein the means for measuring deformation includes at least one load cell.

23. A transmission according to claim 18, wherein the means for measuring deformation includes at least one strain gauge.

24. A transmission according to claim 18, wherein the known relationship is substantially linear and values corresponding to the measured deformation are adjusted by a scaling factor.

25. A transmission according to claim 18, wherein the control system is arranged to control a rate of change of torque in the transmission in accordance with the deformation measured.

26. A transmission system as according to claim 1, including first and second rotatable shafts, wherein the plurality of gear ratios is arranged to transfer drive between the first and second shafts and includes first and second gear wheels each rotatably mounted on the first shaft and having drive formations formed thereon, the selector assembly is arranged to selectively transmit torque between the first shaft and the first gear wheel and between the first shaft and the second gear wheel, wherein the selector assembly includes an actuator assembly and first and second sets of engagement members that are moveable into and out of engagement with the first and second gear wheels independently of each other, said selector assembly being arranged such that when a driving force is transmitted, one of the first and second sets of engagement members drivingly engages an engaged gear wheel, and the other set of engagement members is then in an unloaded condition, wherein the actuator assembly is arranged to move the unloaded set of engagement members to effect a gear change.

27. The transmission system as claimed in claim 26, wherein the selector assembly is arranged such that when a braking force is transmitted the first set of engagement members drivingly engages the engaged gear wheel, and the second set of engagement members is in an unloaded condition, and when a driving force is transmitted the second set of engagement members drivingly engages the engaged gear wheel, and the first set of engagement members is then in an unloaded condition.

28. The transmission system as claimed in claim 26, wherein the actuator assembly is arranged to bias the loaded set of engagement members towards an unengaged gear wheel without disengaging the loaded set of engagement members from the engaged gear wheel.

29. A method for changing gear ratios for transmitting drive from a drive source to a transmission comprising a clutch and a plurality of gear ratios, said method comprising
selectively engaging a first gear ratio of the transmission;
selectively transmitting drive from the drive source to the transmission at the first gear ratio,
automatically adjusting a torque limit value of the clutch before selecting a second gear ratio;
engaging the second gear ratio while allowing relative rotational movement between input and output sides of the clutch if the torque exceeds the torque limit value; and
transmitting drive from the drive source to the transmission at the second gear ratio,
wherein the transmission is arranged such that selection of a new gear ratio takes place almost instantaneously without substantial power interruption.

30. A method according to claim 29, further comprising detecting the operational status of the clutch, wherein the adjusting step comprises reducing the clutch torque limit to a predetermined operational status.

31. A method according to claim 29, further comprising increasing the clutch torque limit when the second gear ratio has been selected.

32. A method according to claim 29, further comprising controlling speed and torque of the drive source.

33. A method according to claim 29, wherein the adjusting step comprises reducing the clutch torque limit until the input and output sides of the clutch slip.

34. A method according to claim 33, further comprising detecting slip between the input and output sides of the clutch, wherein the adjusting step comprises reducing the clutch torque limit until the slip between the input and output sides of the clutch is detected.

35. A method according to claim 33, wherein the clutch torque limit is increased when the second gear ratio has been selected.

36. A transmission system including first and second rotatable shafts, first and second gear ratios for transferring drive between the first and second shafts, a selector assembly for selecting between the first and second gear ratios, a clutch device for selectively transmitting drive from a drive source to the transmission, a control system for controlling a clutch torque limit, and wherein the first gear ratio includes a first gear wheel rotatably mounted on the first shaft, the second gear ratio includes a second gear wheel rotatably mounted on the first shaft and the first and second gear wheels each have drive formations formed thereon, the selector assembly is arranged to selectively transmit torque between the first shaft and the first gear wheel and between the first shaft and the second gear wheel, and includes an actuator assembly and first and second sets of engagement members that are moveable into and out of engagement with the first and second gear wheels independently of each other, said selector assembly being arranged such that when a driving force is transmitted, one of the first and second sets of engagement members drivingly engages an engaged gear wheel, and the other set of engagement members is then in an unloaded condition, wherein the actuator assembly is arranged to move the unloaded set of engagement members to effect a gear change and the control system is constructed and arranged to automatically reduce the clutch torque limit until the input and output sides of the clutch slip before the selector assembly selects an unengaged gear ratio, the arrangement being such that further slipping occurs if the torque exceeds the clutch torque limit value when the unengaged gear ratio is engaged by the selector assembly, and further arranged to increase the clutch torque limit when the unengaged gear ratio has been selected by the selector assembly to restore the clutch torque limit to its condition prior to instigating the shift.

* * * * *